(12) United States Patent
Tauber et al.

(10) Patent No.: US 12,411,047 B2
(45) Date of Patent: Sep. 9, 2025

(54) BOLOMETER UNIT CELL PIXEL INTEGRITY CHECK SYSTEMS AND METHODS

(71) Applicant: Teledyne FLIR Commercial Systems, Inc., Goleta, CA (US)

(72) Inventors: Sean Tauber, Ventura, CA (US); Brian B. Simolon, Santa Barbara, CA (US); Naseem Y. Aziz, Goleta, CA (US); Nile E Fairfield, Goleta, CA (US)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 443 days.

(21) Appl. No.: 17/963,973

(22) Filed: Oct. 11, 2022

(65) Prior Publication Data

US 2023/0031084 A1 Feb. 2, 2023

Related U.S. Application Data

(63) Continuation of application No. PCT/US2021/027349, filed on Apr. 14, 2021.

(60) Provisional application No. 63/011,466, filed on Apr. 17, 2020.

(51) Int. Cl.
*G01J 5/80* (2022.01)
*H04N 23/23* (2023.01)

(52) U.S. Cl.
CPC .............. *G01J 5/80* (2022.01); *H04N 23/23* (2023.01)

(58) Field of Classification Search
CPC .. G01J 5/80; H04N 5/33; H04N 23/23; H04N 25/671; H04N 25/76; H04N 25/77; H04N 17/002
See application file for complete search history.

(56) References Cited

U.S. PATENT DOCUMENTS

| | | |
|---|---|---|
| 5,811,808 A | 9/1998 | Cannata et al. |
| 6,249,002 B1 | 6/2001 | Butler |
| 2014/0231651 A1 | 8/2014 | Kim et al. |

(Continued)

FOREIGN PATENT DOCUMENTS

| | | | |
|---|---|---|---|
| KR | 101258039 B1 | 6/2012 | |
| WO | WO 2016/085586 | 6/2016 | |
| WO | WO-2016111734 A2 * | 7/2016 | ............... G01J 1/44 |

*Primary Examiner* — Catherine T. Rastovski
*Assistant Examiner* — Emma Alexander
(74) *Attorney, Agent, or Firm* — Haynes and Boone, LLP

(57) ABSTRACT

Techniques to test infrared detectors are disclosed. In one example, a focal plane array for an imaging system includes a plurality of infrared detectors arranged in a plurality of rows and columns where each of the infrared detectors is configured to provide an output signal in response to externally received thermal radiation associated with a scene. A plurality of offset circuits of the imaging system may be electrically coupled to the focal plane array and configured to selectively superimpose fixed-pattern noise on the output signals to provide modified output signals. A readout integrated circuit of the imaging system may be configured to provide the modified output signals for processing to test an integrity of the infrared detectors. Modified output signals that are outside an expected output range based on the thermal radiation and known offset may be determined defective. Related methods, devices, and systems are also provided.

20 Claims, 11 Drawing Sheets

(56) References Cited

U.S. PATENT DOCUMENTS

2014/0247366 A1 9/2014 Solhusvik et al.
2019/0373192 A1* 12/2019 Cannata ............... H04N 25/672

* cited by examiner

BOLOMETER UNIT CELL PIXEL INTEGRITY CHECK SYSTEMS AND METHODS

CROSS-REFERENCE TO RELATED APPLICATIONS

This application is a continuation of International Patent Application No. PCT/US2021/027349 filed Apr. 14, 2021 and entitled "BOLOMETER UNIT CELL PIXEL INTEGRITY CHECK SYSTEMS AND METHODS," which claims the benefit of U.S. Provisional Patent Application No. 63/011,466 filed Apr. 17, 2020 and entitled "BOLOMETER UNIT CELL PIXEL INTEGRITY CHECK SYSTEMS AND METHODS" all of which are hereby incorporated by reference in their entirety.

TECHNICAL FIELD

One or more embodiments of the invention relate generally to thermal imaging devices and more particularly, for example, to bolometer circuitry and bolometer unit cell pixel integrity checking.

BACKGROUND

Imaging systems may include an array of detectors (e.g., sensors), with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for infrared imaging, readout of image data captured by the detectors may be performed in a time-multiplexed manner by a readout integrated circuit (ROIC). The image data that is read out may be communicated to other circuitry, such as for processing, storage, and/or display. In some cases, a combination of a detector array and an ROIC may be referred to as a focal plane array (FPA). Advances in process technology for FPAs and image processing have led to increased capabilities and sophistication of resulting imaging systems.

In some cases, the image detectors of an FPA may be defective due to manufacturing variances or degradation. Defective image detectors may be malfunctioning or not performing as expected. For example, a defective image detector may fail to sense EM radiation correctly, which may lead to inaccurate readouts for the FPA during an image frame capture. In some instances, defective detectors may lead to what is known as dead pixels, stuck pixels, and hot pixels.

As thermal imagers are increasingly being integrated and relied upon in everyday machinery, the integrity of individual image detectors in FPAs of such thermal imagers becomes more vital. Thus, there exists a need in the art for improved techniques related to checking the integrity of image detectors in imaging systems.

SUMMARY

In one or more embodiments, an imaging system includes a focal plane array that has a plurality of infrared detectors (e.g., sensors) arranged in a plurality of rows and columns, where each of the infrared detectors is configured to provide an output signal in response to externally received thermal radiation. The imaging system may further include a plurality of offset circuits electrically coupled to the focal plane array and configured to selectively superimpose fixed-pattern noise on the output signals to provide modified output signals. The imaging system may further include a readout integrated circuit configured to provide the modified output signals for processing by a logic device.

In one or more embodiments, for a method of operating an imaging device, the method includes receiving external thermal radiation onto a focal plane array comprising a plurality of infrared detectors arranged in a plurality of rows and columns and configured to receive the external thermal radiation and provide an output signal in response to the externally received thermal radiation. The method further includes selectively superimposing fixed-pattern noise on the output signals to provide modified output signals, where the superimposing is performed using a plurality of offset circuits electrically coupled to the focal plane array and configured to selectively superimpose the fixed-pattern noise on the output signals to provide the modified output signals. The method may further include reading out the modified output signals from each of the infrared detectors of the focal plane array in a row-by-row fashion for processing by a logic device, where the readout is performed using a readout integrated circuit electrically coupled to the focal plane array.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
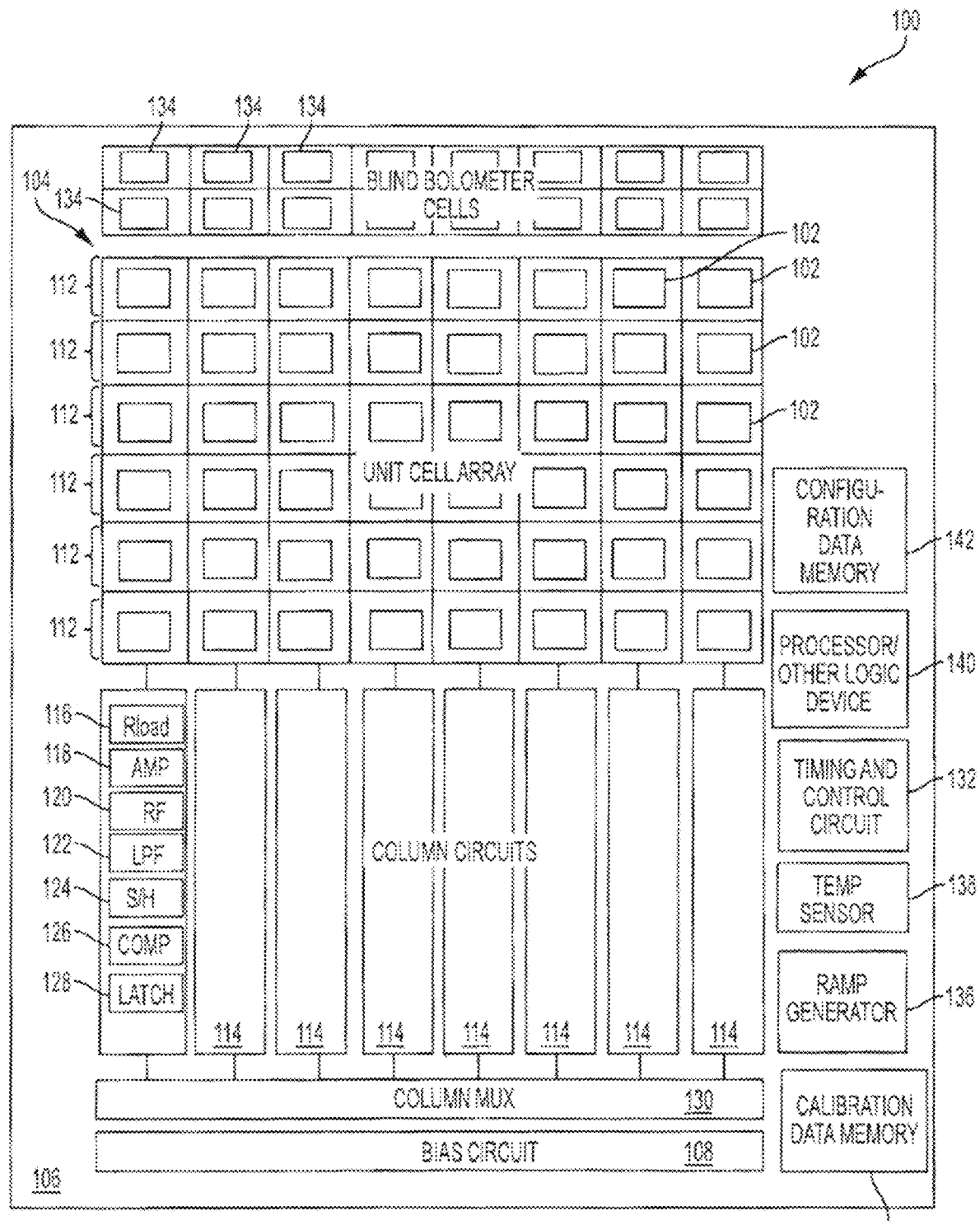
FIG. 1 illustrates a block diagram of an example imaging system in accordance with one or more embodiments of the present disclosure.

In some embodiments, systems and methods are provided for testing an integrity of image detectors (e.g., also referred to as sensors, pixels, active bolometers, and/or unit cells) in a focal plane array of a thermal imager. For example, such systems and methods may be relevant to ISO26262, which identifies a functional safety standard for automotive equipment applicable throughout the lifecycle of all automotive electronic and electrical safety-related systems. Such standards may require data integrity in bolometer design from an analog and digital perspective. The present disclosure describes an intentional offset that can be selectively induced in every pixel of a focal plane array and/or in a column-wise and/or row-wise manner using offset circuits. The ability to turn the offset circuits on or off throughout the entire focal plane array allows for intentional fixed-pattern noise to be injected and checked before leaving a chip to determine whether each detector in the array is functioning properly or defective.

In this regard, a fixed-pattern in the analog domain may be used by an analog-to-digital converter (ADC) or digital block to check that detectors are functioning correctly prior to going off chip. Detectors that do not obey the fixed-pattern that has been programmed into the focal plane array may be flagged as defective and this feedback may be sent upstream to host advanced driver-assistance systems (ADAS), which may take certain remedial actions if the detectors marked non-functional are in a mission critical area of the focal plane array. This allows the host ADAS to quickly enter a safe state.

According to an embodiment, by introducing a known offset to detectors along with useable image data, transient events may be caught. Prior techniques such as running test ramps between frames to check for errors may miss the transient event. A check of every detector in a focal plane array during image capture is a robust way of capturing transient failures with a high level of diagnostic coverage.

In various embodiments of the present disclosure, an imaging system may include a focal plane array, a plurality of offset circuits, and a readout integrated circuit. For example, the focal plane array may include a plurality of infrared detector arranged in a plurality of rows and columns where each of the infrared detectors is configured to provide an output signal in response to externally received thermal radiation. The plurality of offset circuits may be electrically coupled to the focal plane array and configured to selectively superimpose fixed-pattern noise on the output signals of the detectors to provide modified output signals for the detectors. As an example, a high-low alternating pattern (e.g., HLHLHL) may be induced in the focal plane array for detector integrity-checking purposes. The readout integrated circuit may be configured to provide the modified output signals for processing by a logic device communicatively coupled to the focal plane array.

In an embodiment, the logic device may compare each of the modified output signals to an expected output or output range associated with the externally received thermal radiation and the fixed-pattern noise. For example, a value associated with the fixed-pattern noise may be determined based on a temperature associated with the focal plane array (e.g., ambient temperature). The expected output range may be calculated based on the known value associated with the thermal radiation (e.g., the thermal radiation received in a test/subsequent image may be substantially equivalent to that of a previously captured image as the scene may generally be the same between captured frames) and the determined value associated with the fixed-pattern noise.

Based on the comparison of the modified output signals to the expected output or output range, infrared detectors corresponding to the modified output signals may be identified as defective or functional (e.g., normal, non-defective). For example, if a modified output signal is outside of the expected output range, the infrared detector corresponding to the modified output signal may be identified as defective.

The offset circuit for the imaging system may be implemented in various ways. For example, the offset circuit may include a resistor and a switch in parallel with the resistor in some embodiments. The switch may be configured to selectively direct a current passed by at least one of the infrared detectors through the resistor to selectively superimpose the fixed-pattern noise on the output signal of the infrared detector. In other embodiments, the offset circuit may be a variable resistance transistor (e.g., MOSFET) configured to selectively adjust a current passed by at least one of the infrared detectors through the transistor to selectively superimpose the fixed-pattern noise on the output signal of the infrared detector.

In various embodiments, the offset circuit may be implemented in the focal plane array at a unit cell level. For example, each unit cell of the focal plane array may have an infrared detector and a corresponding offset circuit disposed within the unit cell. The offset circuit of the unit cells may be activated to superimpose the fixed-pattern noise onto the output signal of the infrared detector of the unit cell. Thus, the fixed-pattern noise and the associated known offset caused by the fixed-pattern noise superimposed at the unit cell level may be used to identify whether the corresponding infrared detector is defective.

In additional embodiments, the offset circuit may be implemented in the focal plane array at a column level. For example, each offset circuit may be located within the column circuits of the focal plane array such they are on a column read line (e.g., conduction path) for the column. In such cases, the offset circuit may be activated for each infrared detector of the column as the focal plane array is read out in a row-by-row fashion to superimpose fixed-pattern noise on each of the infrared detectors of the column. The fixed-pattern noise and the associated known offset caused by the fixed-pattern noise superimposed at the column level may be used to identify whether the infrared detectors corresponding to the column are defective.

To illustrate a simplified example, a focal plane array may be implemented with an offset circuit in every unit cell of a microbolometer. In a testing mode, the focal plane array may receive thermal radiation from a test image frame where the intensity values are known/expected based on a readout of the focal plane array of the thermal radiation for a previously captured image frame. The offset circuit may superimpose between 25 to 350 counts (positive or negative) on a digitized output of each unit cell of the focal plane array, which may scale due to an ambient temperature of the focal plane array. The count offset may be observed at a readout of the focal plane array when the output values of the readout are compared to the known/expected readout given the test image frame is substantially unchanged from a previous image frame captured in response to substantially unchanged thermal radiation. Microbolometers that have output values that do not match the known/expected value with a delta attributable to the offset may be identified and flagged as defective.

FIG. 1 illustrates an example bolometer circuit 100 according to an embodiment of the present disclosure. Bolometer circuit 100 comprises a plurality of active bolometers 102, which may be configured as an array arranged in a rectangle, square, circle, line or other shape. In some non-limiting examples, active bolometers 102 may be provided as a rectangular array having a dimension of 80×60, 160×120, 120×240, or any other dimension desired for a particular application. Bolometer circuit 100 may comprise various components and circuits, which may be collectively referred to as a Read Out Integrated Circuit (ROIC), that interface with active bolometers 102 to generate an output as further describe herein. Bolometer circuits, such as some embodiments of bolometer circuit 100, that have an array of active bolometers and associated circuits formed together on a substrate may also be referred to as focal plane arrays (FPAs).

Some portions (e.g., switches for a particular bolometer) of the ROIC may be associated with and placed in proximity to each particular one of active bolometers 102. Each one of active bolometers 102 together with its associated portion of the ROIC may also be referred to as a unit cell. Since active bolometers 102 may be configured as an array, corresponding unit cells may form a unit cell array 104. Also, in the context of imaging, each one of active bolometers 102 may also be referred to as a pixel.

Active bolometers 102 may be provided on a substrate 106, but substantially thermally isolated from substrate 106 (e.g., released from substrate 106 such that active bolometers 102 are not substantially affected thermally by substrate 106). Active bolometers 102 may be configured to receive infrared radiation from an external scene, for example, directed onto active bolometers 102 by an optical element such as an infrared-transmissive lens. Infrared ("IR") radiation incident on active bolometers 102 changes the temperature, and therefore the resistivity, of active bolometers 102 as would be understood by one skilled in the art. The temperature and the resistivity of active bolometers 102 may also track the temperature of substrate 106, but because active bolometers 102 are thermally isolated from substrate 106, the rate of temperature change due to substrate is slower than that due to incident infrared radiation. The ROIC of bolometer circuit 100 comprises various components and circuits configured to generate an output based on the resistivity changes of active bolometers 102 due to incident infrared radiation.

In one aspect, bolometer circuit 100 may include a bias circuit 108 configured to control a bias (e.g., a bias voltage or current) across active bolometers 102 in generating such an output. In general, a bias may be applied across a bolometer so that the resistance (or any change thereof) of the bolometer can be measured. According to various embodiments of bolometer circuit 100, bias circuit 108 may be utilized to control the bias applied across active bolometers 102 to an appropriate level as further described herein, so that the nominal values of active bolometer measurements may be adjusted to fall within a desired range. In this regard, according to some embodiments, bias circuit 108 may be configured to set the bias based on calibration data (e.g., adjustment values stored as binary bits) stored in a calibration data memory 109. In other embodiments, such calibration data may be provided from a source external to bolometer circuit 100 (e.g., from an external processor and/or memory), directly to bias circuit 108 or via calibration data memory 109.

In some embodiments, bias circuit 108 may be configured to set the bias globally for all active bolometers 102. In other embodiments, bias circuit 108 may be configured to provide a particular bias level to each individual one or group of active bolometers 102. In yet other embodiments, bias circuit 108 may be configured to set a global bias level for all active bolometers 102 and to apply a biasing adjustment particular to each one or group of active bolometers 102.

As discussed, bolometer circuit 100 includes a plurality of active bolometers 102 in an array or other arrangement. According to one or more embodiments of bolometer circuit 100, reduction of circuitry and interconnection may be achieved by appropriate multiplexing of active bolometers 102 to various components of the ROIC. For example, in one embodiment, rather than replicating similar circuitry for every row 112 of unit cell array 104, rows 112 may be multiplexed to column circuits 114 comprising common components 116 through 128 that may be utilized for all rows 112 in a time-multiplexed manner. As further discussed herein, components of column circuit 114 may include a load bolometer 116, an amplifier 118, a feedback resistor 120, a low pass filter ("LPF") 122, a sample-and-hold circuit 124, a comparator 126, a latch 128, and/or other components, according to one or more embodiments.

In the example shown in FIG. 1, each column of unit cell array 104 has a corresponding one of column circuits 114, such that all rows of unit cells in a single column may be multiplexed to a single corresponding column circuit. The plurality of column circuits 114 may in turn be multiplexed by a column multiplexer 130, for example, to generate a combined output for unit cell array 104 in a multiplexed manner. It is contemplated that in other embodiments, column circuits may be provided in numbers greater or fewer than the number of columns in unit cell array 104. It is also contemplated that unit cell array 104 may comprise appropriate ROIC components to generate an output without multiplexing. It should be noted that the terms "column" and "row" herein are used as mere labels to facilitate illustration, and thus may be used interchangeably depending on structures being described.

In one or more embodiments, bolometer circuit 100 may include a timing and control circuit 132 configured to generate control signals for multiplexing active bolometers 102 and column circuits 114. For example, timing and control circuit 132 may be configured to control switches associated with active bolometers 102 and column circuits 114 to selectively connect active bolometers 102 to appropriate column circuits 114 according to specified timing to enable timed-multiplexing of active bolometers 102 to column circuits 114. In some embodiments, timing and control circuit 132 may be further configured to provide timed control of other components of bolometer circuit 100. For example, portions of bias circuit 108, blind bolometer cells, offset circuits 202 or other components may be selectively enabled and/or connected in conjunction with the multiplexing of active bolometers 102, by way of control signals generated by timing and control circuit 132 according to appropriate timing. In another example, calibration data (e.g., adjustment bits stored in calibration data memory 109) or other data may be provided (e.g., transmitted, transferred, and/or latched) to appropriate components (e.g., bias circuit 108) of bolometer circuit 100 according to specified timing in response to control signals from timing and control circuit 132.

In some embodiments, additional switches may be provided for active bolometers 102 that allow configuration of active bolometers 102 for measuring differences in resistance changes between the adjacent ones of active bolometers 102, and timing and control circuit 132 may be configured to generate control signals for such additional switches to enable capturing of difference images (e.g., representing differences in infrared radiation incident on adjacent active bolometers 102) by bolometer circuit 100. As further described herein, bolometer circuit 100 configured to obtain difference images according to such embodiments may beneficially reduce the effects on an output signal by variations among active bolometers 102, substrate or ambient temperature changes, and self-heating (e.g., pulse bias heating) of active bolometers 102. Further, bolometer circuit 100 according to such embodiments may be utilized to obtain images with a high scene dynamic range by reconstructing scene images from local difference of adjacent pixels.

Bolometer circuit 100 according to some embodiments may include blind bolometers 134. Blind bolometers 134 are thermally isolated (e.g., released) from substrate 106, similar to active bolometers 102. However, unlike active bolometers 102, blind bolometers 134 are shielded from infrared radiation from an external scene. As such, blind bolometers 134 do not substantially change temperature in response to the incident radiation level from an external scene but do change temperature as a result of self-heating (e.g., pulse bias heating) and temperature changes in substrate 106. Because both active bolometers 102 and blind bolometers 134 to a first order track temperature changes due to self-heating and substrate temperature changes, blind bolometers 134 may be configured as references for adjusting biases for active bolometers 102 and/or as references for reconstructing scene images from difference images according to various embodiments further discussed herein. Some example techniques to implement blind bolometers 134 may be found in International Patent Application No. PCT/US2012/049051 filed Jul. 31, 2012 and entitled "Determination of an Absolute Radiometric Value Using Blocked Infrared Sensors." Blind bolometer 134 together with its associated circuitry (e.g., associated switches) may be referred to as a blind bolometer cell.

Bolometer circuit 100 according to some embodiments may include a ramp generator 136. Ramp generator 136 may be configured to generate a ramp signal for performing a ramp-compare analog-to-digital (A/D) conversion or for other use (e.g., as a reference signal in detecting a clock rate) in bolometer circuit 100. In other embodiments of bolometer circuit 100, for example in embodiments that do not include A/D conversion circuitry, ramp generator 136 may be omitted from bolometer circuit 100. For example, A/D conversion circuitry and a ramp generator may be external to bolometer circuit 100 according to some embodiments.

Bolometer circuit 100 according to some embodiments may include a temperature sensor 138 configured to detect an ambient temperature associated with substrate 106 of bolometer circuit 100. Substrate temperature readings obtained via temperature sensor 138 may, for example, be used to obtain and apply calibration data over a range of substrate temperatures. In some embodiments, temperature sensor 138 may be disposed on substrate 106 in close proximity to active bolometers 102 and/or blind bolometers 134, so that the temperature reading obtained by temperature sensor 138 may closely track the substrate temperature effecting these components. In some embodiments, bolometer circuit 100 may be configured to output a substrate temperature reading based on the temperature detected by temperature sensor 138, so that the substrate temperature reading may be accessed by components external to bolometer circuit 100 (e.g., by a processor external to bolometer circuit 100). For example, such a substrate temperature reading may be utilized to perform various correction (e.g., non-uniformity correction) and calibration processes by a processor or other logic device.

In some embodiments, bolometer circuit 100 may include a processor or other logic device 140 configured to perform various operations associated with bolometer circuit 100, based on configuration data stored in a configuration data memory 142. For example, in one embodiment, processor or other logic device 140 may be configured to perform at least part of the various processes disclosed herein below. In other embodiments, other external components (e.g., a processor of a host device) or internal components (e.g., timing and control circuit 132) may additionally or alternatively be configured to perform at least part of the various processes disclosed herein below.

According to one or more embodiments, processor or other logic device 140 may be implemented with any appropriate combination of processing devices, such as a general-purpose central processing unit ("CPU"), a programmable logic device ("PLD") including a field programmable logic device ("FPGA"), a hardwired application-specific integrated circuit ("ASIC"), a digital signal processor (DSP), an image signal processor (ISP), or other logic device that may perform processing operations by executing instructions provided from configuration data memory 142 and/or by configuring logic circuits according configuration data (e.g., FPGA configuration data) provided from configuration data memory 142.

As discussed, FIG. 1 is a block diagram to facilitate description and explanation of bolometer circuit 100 and its various components for one or more embodiments of the disclosure. As such, the block diagram of FIG. 1 is not intended to limit the size, the number, the placement, or the orientation of the various components illustrated therein. For example, although blind bolometers are represented by rows of blind bolometers 134 above unit cell array 104 in FIG. 1, some or all of the blind bolometers represented by blind bolometers 134 may be provided as one or more columns of blind bolometers (e.g., to implement blind bolometers for bias columns, as further discussed herein) adjacent to columns of unit cell array 104 as desired for particular implementations of bolometer circuit 100 according to various embodiments.

Figure 2A:
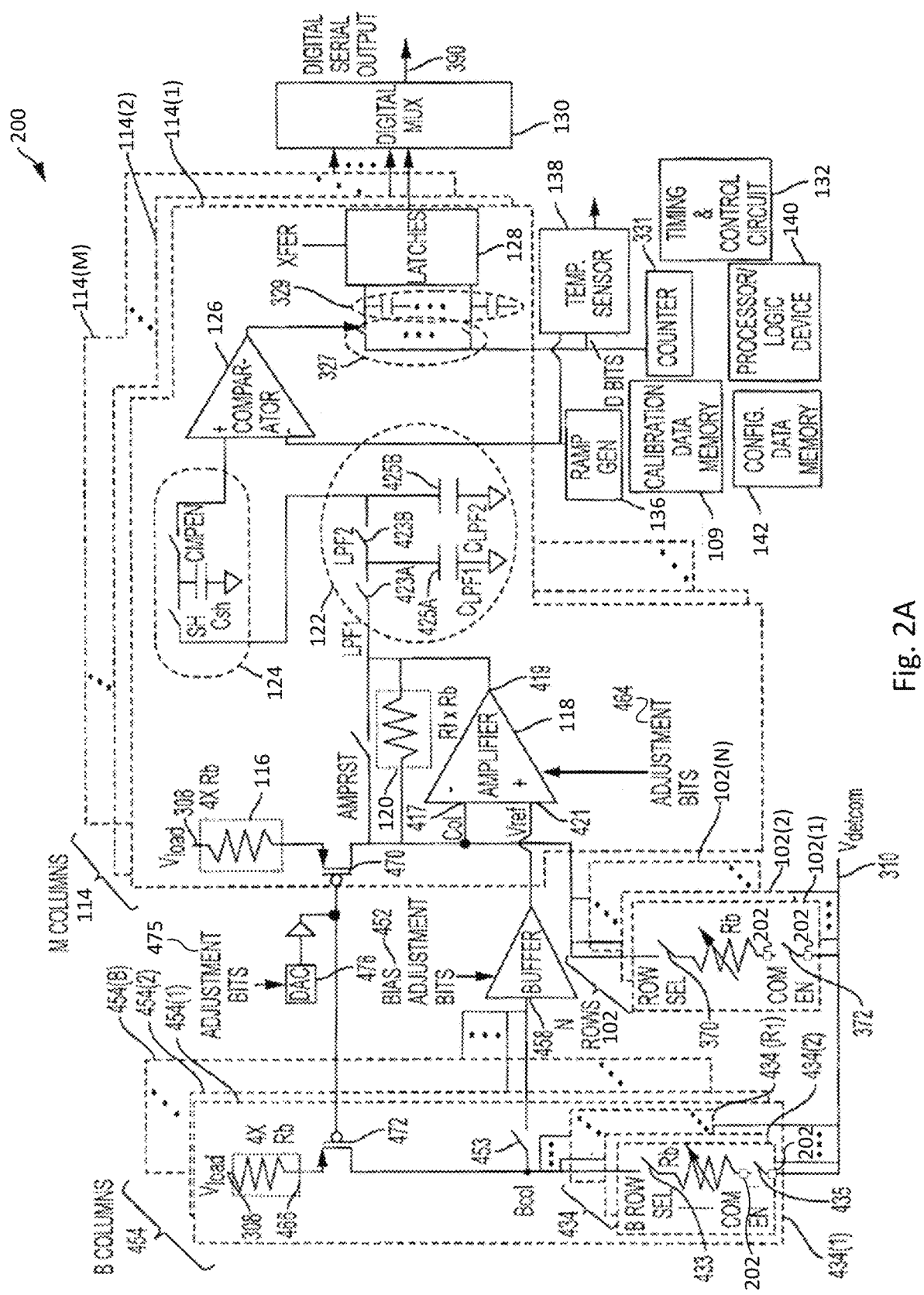
FIG. 2A illustrates a bolometer circuit of an imaging system and several locations where an offset circuit may be implemented in accordance with one or more embodiments of the present disclosure.

FIG. 2A illustrates example embodiments of a bolometer circuit 200 having several locations where an offset circuit 202 may be implemented at a unit cell level. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

Bolometer circuit 200 may include one or more column circuit blocks 114 (individually identified as column circuit block 114(1) through 114(M), where M may represent the desired number of columns in unit cell array 104). Each column circuit block 114 may be associated with one or more active bolometers 102. In FIG. 2A, only those one or more active bolometers 102 (individually identified as active bolometers 102(1) through 102(N), where N may represent the desired number of rows in unit cell array 104) that are associated with column circuit block 114(1) are shown for clarity, but it will be understood that other active bolometers 102 not explicitly shown in FIG. 2A may be provided and associated with other column circuit blocks 114(2) through 114(M).

Each active bolometer 102 may be accompanied by switches 370 and 372 for selectively enabling and connecting to a corresponding one of column circuit blocks 114 (e.g., via a column read line).

In some cases, column circuit block 114 of FIG. 2A may represent one of column circuits 114 of bolometer circuit 100 of FIG. 1, and active bolometer 102 of FIG. 2A may represent one of active bolometers 102 of bolometer circuit 100 of FIG. 1. In this regard, bolometer circuit 200 according to various embodiments may further include a column multiplexer 130, a calibration data memory 109, a timing and control circuit 132, a ramp generator 136, a temperature sensor 138, a processor or other logic device 140, and/or a configuration data memory 142, all of which may be implemented in a similar manner as their corresponding components of bolometer circuit 100.

According to various embodiments, each column circuit block 114 may include a thermally shorted bolometer 116, an amplifier 118 (an operational amplifier), a thermally shorted bolometer 120 (e.g., feedback bolometer), an LPF 122, and/or a sample-and-hold circuit 124, all of which may be implemented in a similar manner as their corresponding components of bolometer circuit 100. Amplifier 118, thermally shorted bolometer 120, and other components that may be associated with amplifier 118 and/or thermally shorted bolometer 120 may be referred to herein as belonging to an amplifier circuit for column circuit block 114.

Thermally shorted bolometer 120 may be coupled in parallel across an inverting input 417 and an output 419 of amplifier 118, thereby configuring amplifier 118 as a feedback amplifier. Thermally shorted bolometer 120 may be configured with a resistance to provide a desired gain for amplifier 118. For example, thermally shorted bolometer 120 may be configured to exhibit a resistance Rf×Rb as shown in FIG. 2A, where Rf may represent a gain factor and Rb may represent a resistance of active bolometer 102.

In various embodiments, thermally shorted bolometer 116 may be coupled to supply voltage node 308 at one end, and a transistor 470 on a circuit path leading to one or more associated active bolometers 102(1)-102(N) at the other end. In general, the resistance of thermally shorted bolometer 116 and the resistance of active bolometer 102 may be determined as desired for particular implementations of bolometer circuit 200, taking into account, for example, a supply voltage range, operating characteristics of other components of bolometer circuit 200, a desired range of bias, and other implementation parameters. For example, the ratio of the resistance of thermally shorted bolometer 116 and the resistance of active bolometer 102 may be set to K, such as by providing a thermally shorted bolometer 116 having a resistance of K×Rb, where K may be any desired value for particular implementation parameters and need not be an integral number. In the illustrated embodiment, thermally shorted bolometers 116 and active bolometers 102 have a similar resistance (i.e., the resistance ratio of thermally shorted bolometers 116 to active bolometer is approximately 1).

In various embodiments, one of active bolometers 102(1)-102(N) may be coupled to thermally shorted bolometer 116 and transistor 470 via switch 370 at one end. Thermally shorted bolometer 116 and transistor 470 connected in series in this manner according to one or more embodiments may also be referred to herein as a resistive load for each column circuit block 114. Further, the one of active bolometers 102(1)-102(N) may be coupled to a common voltage node 310 via another switch 372 at the other end. For example, one or more active bolometers 102 may each be selectively enabled and electrically connected to the resistive load and node 310 of a corresponding one of column circuit blocks 114 (e.g., via switches 370 and 372 being open or closed according to control signals from timing and control circuit 132) to form a bolometer conduction path. Switches 370 and 372 and associated switching circuitry (e.g., implemented as part of timing and control circuit 132) may be implemented using appropriate techniques for multi-pixels bolometer circuits, including such techniques, for example, as those described in U.S. Pat. No. 6,812,465 entitled "Microbolometer Focal Plane Array Methods and Circuitry" and U.S. Pat. No. 7,679,048 entitled "Systems and Methods for Selecting Microbolometers within Microbolometer Focal Plane Arrays," which are incorporated herein by reference in their entireties.

With a desired level of bias applied, a resistance change due to incident infrared radiation at active bolometers 102 produces an amplified output voltage at output 419 of amplifier 118. Output 419 of amplifier 118 is coupled to LPF 122, which may be implemented with a switched capacitor circuit comprising one or more capacitors 425A-B and one or more associated switches 423A-B. In the example shown in FIG. 2A, the switched capacitor circuit is configured to open or close switches 423A and 423B according to desired timing (e.g., based on a clock signal) to achieve desired analog signal filtering properties. For other embodiments, however, LPF 122 for bolometer circuit 200 may alternatively be implemented using a resistor-capacitor (RC) network LPF. At the other end, LPF 122 is coupled to sample-and-hold circuit 124, which may be implemented using one or more switches and one or more capacitors (as illustrated for example in FIG. 2A) to substantially maintain filtered analog voltage level (e.g., filtered analog signal) indicative of an intensity of incident infrared radiation received at active bolometers 102.

In various embodiments, each column circuit block 114 may include a comparator 126, switches 327, capacitors 329, and latches 128, which may be utilized to convert the filtered analog voltage level captured at sample-and-hold circuit 124 into a digital output value (e.g., by performing a ramp-compare analog-to-digital conversion). For example, comparator 126 may be configured to receive the voltage level from sample-and-hold circuit 124 and the ramp signal from ramp generator 136, and to compare the voltage level and the ramp signal to trigger (e.g., generate a signal to close switches 327) when the ramp signal substantially matches the voltage level.

In this regard, bolometer circuit 200 may also include a counter 331 (e.g., a digital counter in some embodiments) configured to increment (or decrement depending on the implementation of counter 331) a count value (e.g., encoded in one or more count signals) in response to receiving a clock signal. The count value incremented or decremented by counter 331 may have a substantially similar period (e.g., resets to zero or a base value at substantially the same time) as the ramp signal generated by ramp generator 136. When comparator 126 triggers, the current count value may be selected and stored in latches 128 as a digital value. The output of latches 128 of each column circuit block 314 may be coupled to column multiplexer 130 configured to multiplex the digital values stored in latches 128 for each column circuit block 114 to generate a digital serial output 390 for all columns in bolometer circuit 200. In various embodiments, timing and control circuit 132, processor or other logic device 140, and/or other component of bolometer circuit 200 may be configured to repeat generation of digital serial output 390 for all rows of active bolometers 102 according to predetermined timing, such that a concatenation of digital serial output 390 may digitally represent an image frame of infrared radiation received at active bolometers 102 of bolometer circuit 200. Thus, for example, embodiments of bolometer circuit 200 may configured to capture a sequence of infrared image frames.

In some cases, self-heating of active bolometers may occur due to the current flow therein and resulting power dissipation through active bolometers while they are biased to obtain a measurement of incident infrared radiation. In that sense, self-heating of active bolometers may also be referred to as bias heating or pulse bias heating, for example in cases where active bolometers of an FPA are periodically connected to a column circuit and biased for some duration, which results in pulses of active bolometer heating and cooling. The temperature, and therefore the resistance, of active bolometers is affected by self-heating since active bolometers are isolated (e.g., released) from a substrate, whereas the temperature of thermally shorted bolometers is not appreciably affected by self-heating because of the thermal shorting to the substrate acting as a heat sink.

As may be appreciated, temperature changes of an active bolometer due to self-heating may limit the usable output signal range (or output signal swing) for measuring incident infrared radiation received at the active bolometer, even when a thermally shorted bolometer is used as a temperature-compensated load, and even when biases for the active bolometer and the thermally shorted bolometer are set and maintained at a predetermined level. To reduce such undesirable effects of active bolometer self-heating, various embodiments of bolometer circuit 200 may vary the bias-setting reference voltage Vref in response to self-heating of active bolometers to correct for the resistance changes of active bolometers due to self-heating.

More specifically, as shown in FIG. 2A, one or more bias columns 454 each providing (e.g., at a node labeled "BCol" in FIG. 2A) a voltage level that varies in response to self-heating of one or more associated blind bolometers 434 that track self-heating of active bolometers 102 may be implemented according to various embodiments. For example, in FIG. 2A, bias columns 454(1) through 454(B) are individually identified where "B" denotes the desired number of bias columns, and blind bolometers 434(1) through 434(R1) are individually identified where "R1" denotes the number of blind bolometers associated with bias column 454(1). Other bias columns 454(2) through 454(B) may each be associated with a corresponding number (denoted R2, R3, . . . , RB) of blind bolometers (not explicitly shown in FIG. 2A), where R1, R2, R3, . . . , RB may be same or different depending on embodiments.

Blind bolometers 434 may be implemented in a similar manner as blind bolometers 134 discussed above in connection with FIG. 1. That is, blind bolometers 434 are thermally isolated (e.g., released) from a substrate while being substantially shielded (e.g., shielded to the extent allowed by a typical fabrication process) from incident infrared radiation, and thus their temperatures change due to self-heating and substrate temperature changes but not incident infrared radiation. In one or more embodiments, blind bolometers 434 may be implemented to exhibit a similar temperature coefficient of resistance (TCR) and resistance value as active bolometers 102.

Each bias column 454 comprises a thermally shorted bolometer 466 that may be implemented in a similar manner as thermally shorted bolometer 316 and act as a temperature-compensated load. Thermally shorted bolometer 456 may be selectively coupled to one of blind bolometers 434 in series in a conduction path extending from supply voltage node 308 to common voltage node 310, thereby mirroring the conduction path comprising thermally shorted bolometer 316 and active bolometer 102 for measuring incident IR radiation. Because of such mirroring of active bolometers 102 using blind bolometers 434 that track resistance changes at active bolometers 102 due to self-heating, each bias column 454 may act as a voltage divider that provides a varying voltage level (e.g., when taken from the node labeled BCol) indicative of at what level the bias-setting reference voltage Vref should be in order for the output voltage (e.g., output signal) of an amplifier 118 of column circuit block 114 to represent predominantly or exclusively incident infrared radiation from a scene given the temperature variations attributable to self-heating at active bolometer 102. In this sense, bias columns 454 may also be referred to as reference conduction paths.

In this regard, node BCol between thermally transistor 472 (e.g., switch) and a connected and enabled one of blind bolometers 434 may be coupled to an input 421 (e.g., a non-inverting input) of amplifier 118 to supply a voltage level at node BCol as the reference voltage Vref to amplifier 118. In one or more embodiments, node BCol of each bias column 454 and input 421 of amplifier 118 may be coupled via a buffer 458 configured to adjust an input voltage from BCol in response to bias adjustment bits 452 and to output the adjusted input voltage. In such embodiments, bias adjustment bits 452 (e.g., stored in calibration data memory 109) may be applied to make a global fine adjustment to the varying, self-heating-compensating voltage level provided by one or more bias columns 454, for example. If two or more bias columns 454 are provided (e.g., B>=2), the voltage levels at nodes BCol of bias columns 454(1) through 454(B) are averaged by virtue of parallel paths respectively connecting nodes BCol of columns 454(1) through 454(B) to buffer 458, thereby providing a more accurate reference voltage Vref to amplifier 118, for example. In this regard, some embodiments may include a column switch 453 for each bias column 454, which may be opened or closed (e.g., by a control bit) to selectively disconnect a corresponding bias column 454, in case a particular bias column 454 is not providing an accurate reference voltage Vref, for example.

As discussed above, each bias column 454 may comprise one or more associated blind bolometers 434. In some embodiments, a plurality of associated blind bolometers 434 may be provided for each bias column 454 and selectively enabled and connected to thermally shorted bolometer 466 to form the voltage divider discussed above. More specifically for some embodiments, switches 433 and 435 may be provided for each blind bolometer 434, and selectively closed or opened according to appropriate timing based on signals from timing and control circuit 132. For example, timing and control circuit 132 may be configured to control switches 433 and 435 for blind bolometers 434 and switches 370 and 372 for active bolometers 102, such that each blind bolometer 434 may be selectively enabled and connected to produce a voltage level at node BCol in connection with (e.g., synchronous with) the selection and enabling of a corresponding one of active bolometers 102, thereby allowing the enabled and connected one of blind bolometers 434 to track self-heating of the corresponding one of active bolometers 102 while being biased (e.g., during its bias period or bias pulse).

Such switching among a plurality of blind bolometers 434 synchronous with or otherwise consistent with switching of active bolometers 102 may not only enable tracking of the pulse-bias heating pattern of active bolometers 102 but may also allow sufficient time for blind bolometers 434 to cool down to similar temperatures as corresponding active bolometers 102 prior to being biased again. In some embodiments, each bias column 454 may comprise the same number of blind bolometers 434 as the number of rows of active bolometers 102 in bolometer circuit 200 (e.g., R1=R2= . . . =RB=N). That is, for each row of active bolometer 102, there is provided a corresponding blind bolometer 434 in each bias column 454 according to such embodiments. Such embodiments may allow blind bolometers 434 to mirror the pulse bias heating and cooling timing of corresponding active bolometers 102.

In one example, bias columns 454 together with buffer 458 may be represented by bias circuit 108 in FIG. 1. In another example, blind bolometers 434 and associated switches 433 and 435 may be represented by cells (e.g., as columns next to unit cell array 104 rather than rows shown above unit cell array 104) of blind bolometers 134 in FIG. 1, while the remaining portion of bias columns 454 together with buffer 458 may be represented by bias circuit 108 in FIG. 1.

According to various embodiments, amplifier 118 may be configured to adjust the voltage levels at its inputs 417 and/or 421 and/or other operating characteristics of amplifier 118 in response to adjustment bits 464 received from calibration data memory 109 for a corresponding column circuit block 114 or a pixel therein. Amplifier 118 for the various embodiments illustrated by FIG. 2A may thus allow per-column or per-pixel fine adjustment of biases across active bolometers 102, for example.

As further shown in FIG. 2A, bolometer circuit 200 includes a transistor 470 (e.g., a MOSFET 470 according to some embodiments) between thermally shorted bolometer 116 and a node (labeled "Col" in FIG. 2A) that is coupled to input 417 of amplifier 118. As stated above, and reiterated now, thermally shorted bolometer 116 and transistor 470 connected in series in this manner according to one or more embodiments may also be referred to herein as a resistive load for each column circuit block 114.

The source of transistor 470 (e.g., the source of MOSFET 470) is set to a voltage level relative to its gate, thereby producing a voltage difference from supply voltage node 308 across thermally shorted bolometer 116. This voltage difference across the thermally shorted bolometer 116 generates a load current through active bolometer 102. In this regard, thermally shorted bolometer 116 and transistor 470 connected in series may essentially operate as a current source that generates the load current. Similarly, in one or more embodiments, bolometer circuit 200 may include a transistor 472 (e.g., a MOSFET 472 according to some embodiments) between thermally shorted bolometer 466 and node BCol that is coupled to input 421 of amplifier 118. Thermally shorted bolometer 466 and transistor 472 connected in series may similarly operate as a current source that generates a similar load current to blind bolometers 434 for each bias column. By providing transistors 470 and 472, thermally shorted bolometer 116 and 466 are isolated from nodes Col and BCol, respectively, thereby reducing noise from thermally shorted bolometers 116 and 466.

The voltage across active bolometer 102 is defined by the resistance of active bolometer 102 and the load current generated by thermally shorted bolometer 116 and transistor 470. Similarly, the voltage across blind bolometer 434 is defined by the resistance of blind bolometer 434 and the load current generated by thermally shorted bolometer 466 and transistor 472. Thus, as these load currents are increased, the biases across active bolometer 102 and blind bolometer 434 may also be increased. With the load current providing a desired bias level (e.g., a bias current) across active bolometer 102, a voltage level may be determined (e.g., at node Col) in response to the load current flowing through active bolometer 102 that exhibits a resistance change due to the external infrared radiation. With the load current providing a desired bias level (e.g., a bias current) across blind bolometer 434, a reference voltage level to input 421 of amplifier 118 may be determined (e.g., at node BCol) in response to the load current flowing through blind bolometer 434 that tracks self-heating of active bolometer 102. MOSFETs 470 and 472 may be implemented as pMOS transistors according to one or more embodiments In the illustrated embodiment, the gates of MOSFETs 470 and 472 may be connected to a variable voltage source, such as a DAC 476, that provides a variable voltage level to the gates in response to adjustment bits 475. Thus, by controlling the variable voltage level provided by the variable voltage source to the gates of MOSFETs 470 and 472, coarse or fine adjustments to the load currents, and thus to the active bolometer bias and gain, may be made. In addition, by having the transistors (e.g., MOSFETs 470 and 472), the gain from the voltage at input 421 to the current at input 417 of amplifier 118 may be reduced, which in turn beneficially reduces noise from amplifier 118. Therefore, bolometer circuit 200 according to one or more embodiments may reduce noise from amplifier 118 as well as from thermally shorted bolometers 116 and 466.

In one or more embodiments, thermally shorted bolometers 116 and 466 may have an increased resistance and a commensurate increase in a supply voltage level (e.g., a voltage level at supply voltage node 308) to reduce noise in addition to the noise reduction benefit by isolating thermally shorted bolometers 116 and 466 with transistors 470 and 472.

In the non-limiting, illustrated embodiment of FIG. 2A, the resistance of thermally shorted bolometers 116 is larger than the resistance of active bolometer 102 (i.e., the resistance ratio of thermally shorted bolometers 116 to active bolometer 102 is larger than 1). In some embodiments, bolometer circuit 200 may include thermally shorted bolometers 116 and 466 having a resistance that is two to four times that of active bolometers 102 and blind bolometers 434. In the illustrated embodiment, the resistance of thermally shorted bolometers 116 and 466 are approximately four times (indicated in FIG. 2A as "4×Rb") the resistance of active bolometers 102 and blind bolometers 434. With an appropriate increase in the supply voltage level, the load current flowing from the resistive loads (e.g., thermally shorted bolometers 116 and 466) to active bolometers 102 and blind bolometers 434 may be maintained because of the resistance increase of the resistive loads (e.g., thermally shorted bolometers 116 and 466). Thus, the current noise from the resistive loads will be decreased, thereby obtaining a noise reduction benefit.

Remaining portions of bolometer circuit 200 may be implemented in accordance with various embodiments and alternatives described above in connection with FIG. 1.

According to various embodiments, bolometer circuit 200 discussed with respect to FIG. 2A may be implemented for multiple columns and rows of active bolometers 102 that form a focal plane array of a thermal imaging system to generate analog and/or digital output of infrared imaging data for normal or testing modes of operation.

In a testing mode, active bolometers 102 may be tested for integrity. For example, offset circuit 202 may be implemented in one or both of the two locations indicated in FIG. 2A such that offset circuit 202 may be activated to superimpose an intentional offset to an output of each active bolometer 102. The intentional offset may be fixed-pattern noise that can be used to identify whether an active bolometer 102 is defective or operating as intended (e.g., normal operation). In FIG. 2A, offset circuit 202 is implemented above and/or below switch 372 of active bolometers 102. In some embodiments, one or more offset circuits 202 may also be implemented above and/or below switch 435 of blind bolometers 434 to balance the operation of blind bolometers 434 and active bolometers 102.

Active bolometers 102 that have been identified as defective for not obeying the fixed-pattern that has been programmed into the array may be flagged for remedial measures in some cases. In one use case, a thermal imager comprising a focal plane array may be used advanced driver-assistance systems (ADAS). The active bolometers flagged as defective in the focal plane array using the techniques described herein may be sent as feedback upstream to the host ADAS which may then act if the active bolometers marked defective are in a mission critical area of the focal plane array. For example, the host ADAS may quickly enter a safe state if the active bolometers 102 marked defective are in the mission critical area of the focal plane array.

Figures 2B, 2C:
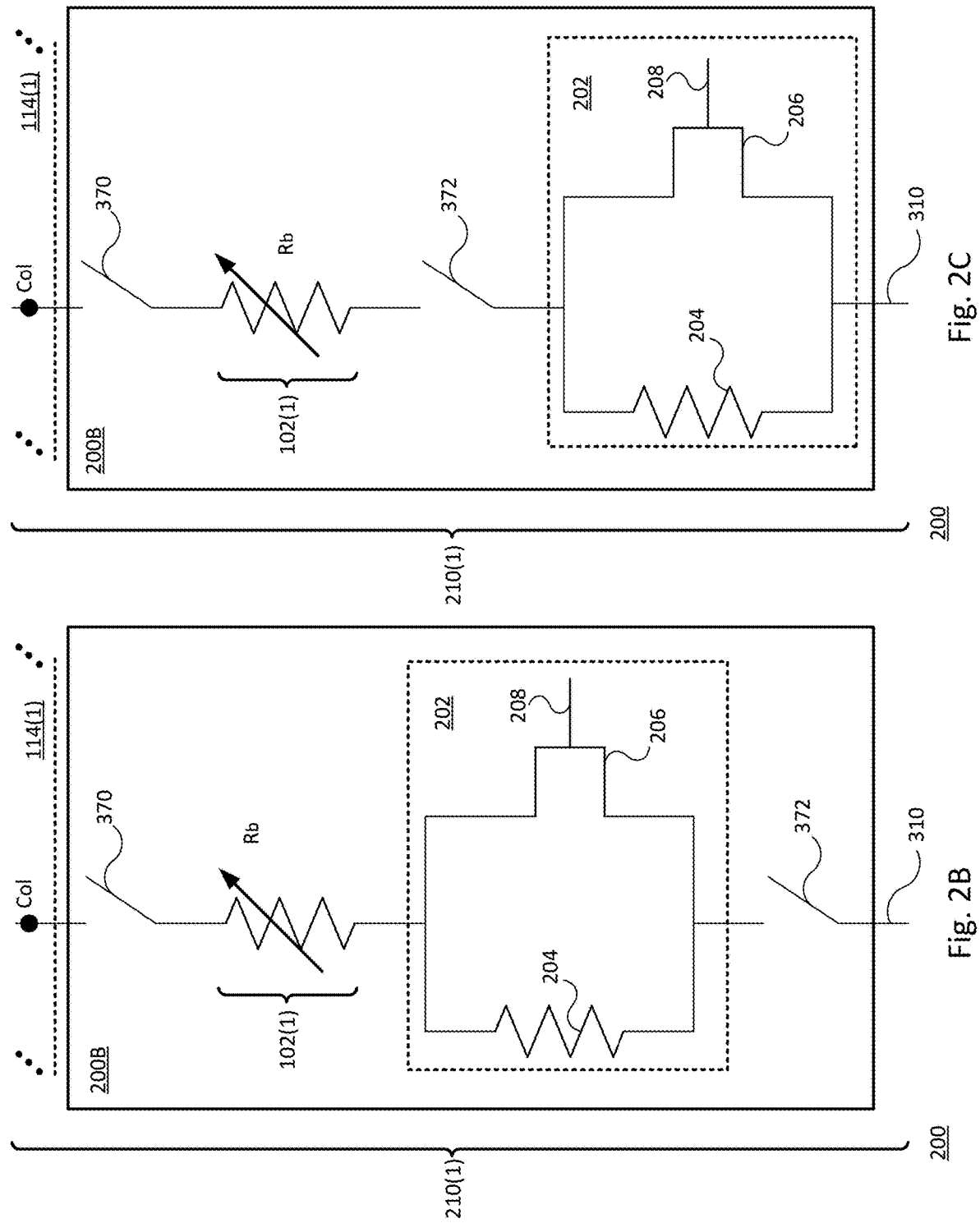
FIGS. 2B-2C illustrate examples of offset circuits implemented at a unit cell level in accordance with one or more embodiments of the present disclosure.

FIG. 2B illustrates an offset circuit 202 implemented within a unit cell 200B of a focal plane array (e.g., bolometer circuit 100 or 200). For explanatory purposes, unit cell 200B corresponds to and includes active bolometer 102(1) of FIG. 2A. It will be appreciated that unit cell 200B may be any one of the unit cells of unit cell array 104 of FIG. 1 where each unit cell includes a corresponding active bolometer according to various embodiments.

As shown in FIG. 2B, offset circuit 202 may have active bolometer 102(1) at one end and switch 372 at a second end such that offset circuit 202 is in series with active bolometer 102(1) and switch 372 on a column read line 210(1) of column circuit block 114(1). Column read line 210(1) may be configured to pass output signals from active bolometer 102(1) to the Col node of column circuit block 114(1), which feeds into input 417 of amplifier 118.

Offset circuit 202 may include a resistor 204 and a switch 206 in parallel with resistor 204 and configured to selectively direct a current passed by active bolometer 102(1) through resistor 204 to selectively superimpose fixed-pattern noise to the output signal of active bolometer 102(1) during a test mode operation for the focal plane array. In this regard, a gate 208 of switch 206 may be selectively activated such that switch 206 may close, allowing the current to bypass resistor 204 in a normal mode of operation of the focal plane array, or open, causing the current to pass through resistor 204 in a test mode of operation. In one embodiment, timing and control circuit 132 may be configured to generate control signals for selectively activating switch 206 via gate 208 according to specified timing schemes that enable timed testing of active bolometers 102 of the focal plane array.

When the current passes through resistor 204, an equivalent resistance based on the resistance of active bolometer 102(1) and resistor 204 will be greater relative to active bolometer 102(1) alone (e.g., when switch 206 is closed and resistor 204 is bypassed). As such, a voltage differential across active bolometer 102(1) and resistor 204 will be greater relative to a voltage differential across active bolometer 102(1) alone when switch 206 is closed. Thus, when switch 206 is opened, resistor 204 causes an offset (e.g., fixed-pattern noise) to be superimposed to the output signal received at the Col node of column circuit block 114(1). In other words, the output signal of active bolometer 102(1) received at the Col node of column circuit block 114(1), in response to active bolometer 102(1) receiving external thermal radiation, may be greater as resistor 204 causes the offset to be superimposed to the output signal. The output signal with the offset superimposed thereto may be referred to as a modified output signal in some embodiments.

The modified output signal may be propagated through column circuit block 114(1) and/or additional readout integrated circuitry as discussed with reference to FIGS. 1 and/or 2A. In various embodiments, each unit cell of a focal plane array may have an offset circuit 202 activated therein to superimpose an offset to output signals of their corresponding active bolometers to provide a plurality of modified output signals that may be read out from the focal plane array by a readout integrated circuit for further processing by a logic device 140.

In some embodiments, logic device 140 may be used to further process the modified output signals once they have been readout by the readout integrated circuit. For example, logic device 140 may perform processing for each of the modified output signals by operating to compare the modified output signal to an expected output or output range associated with the externally received thermal radiation and the fixed-pattern noise.

In some embodiments, the expected output or output range may be calculated based on a known/calculated offset value associated with the fixed-pattern noise. The fixed-pattern noise may be calculated based on a temperature associated with the focal plane array. For example, temperature sensor 138 of FIG. 1 may be configured to detect an ambient temperature associated with a substrate of the focal plane array. Because the fixed-pattern noise may be a function of the ambient temperature, the fixed-pattern noise may be calculated, and consequently, an offset value may be calculated.

Based on the comparison of the modified output signal to the expected output or output range, logic device 140 may further identify whether active bolometers are defective. For example, the logic device may determine that a modified output signal corresponding to active bolometer 102(1) is outside the expected output range, which may indicate that active bolometer 102(1) is defective. If the modified output signal is determined to be within the expected output range, the active bolometer may be identified as operating as intended (e.g., as normal).

As discussed with reference to FIG. 2A, the readout integrated circuit may convert the modified output signal to a digital output value. In this regard, the expected output range may comprise an expected output range of digital values to which the digital output value may be compared. The expected output range may be centered around the expected output, or otherwise include the expected output.

As an illustrative example, resistor 204 of offset circuit 202 may be approximately 500 ohms. When activated during a test mode of operation, offset circuit 202 may modify the output signal of active bolometer 102(1) by offsetting a digital output value (e.g., counts using counter 331) of the active bolometers 102 by a delta amount (e.g., between 25 to 350 counts) between sequential frames. An expected output value for a pixel based on an intensity of external thermal radiation received by the focal plane array in a previous frame may be "X" for example. Thus, the expected output value may be "X" with a delta of an offset between 25 and 350 counts. An expected output range may include the expected output value (e.g., the expected output range may be centered around the expected output value) and provide a margin of error. If the modified output signal of active bolometer 102(1) is outside of the expected output value range, active bolometer 102(1) may be identified (e.g., flagged) as defective. It is noted that the offset of between 25 to 350 counts may be a difference for a pixel readout between a frame without the offset and a frame with the offset added. The range of 25 to 350 counts is provided as a non-limiting example of how the offset can change based on the ambient temperature of the focal plane array. For example, at a lower temperature, the offset between frames may be 25 counts and at a higher temperature, the offset between frames may be 350 counts.

It will be appreciated that resistor 204 may be implemented with various ohmic resistors to suit a desired application. Similarly, switch 206 may be implemented with various circuit devices to suit a desired application. In some cases, resistor 204 may be a 500 ohm resistor and switch 206 may be a MOSFET transistor.

In further implementations, offset circuit 202 may be implemented with a single variable transistor such as a MOSFET. The voltage level of the MOSFET may be controlled to adjust the resistance of the MOSFET to provide an offset in a similar fashion to the resistor 204 and switch 206 implementation discussed above.

It will be appreciated that in some examples, individual active bolometers 102 of the focal plane array may be selected for testing, and in such cases, an offset circuit 202 may only be activated for the individually selected active bolometers 102 during a read out for an image frame capture.

FIG. 2C illustrates an implementation of unit cell 200B of the focal plane array wherein offset circuit 202 is located in a different location than shown in FIG. 2B. As shown FIG. 2C, offset circuit 202 may be located between switch 372 of unit cell 200B at one end and common voltage 310 of column circuit block 114(1) at a second end such that offset circuit 202 is in series with active bolometer 102(1) on column read line 210 corresponding to column circuit block 114(1) when switches 370 and 372 are closed. Offset circuit 202 shown in FIG. 2C may operate in a similar manner as the implementation of offset circuit 202 shown in FIG. 2B.

Figure 3A:
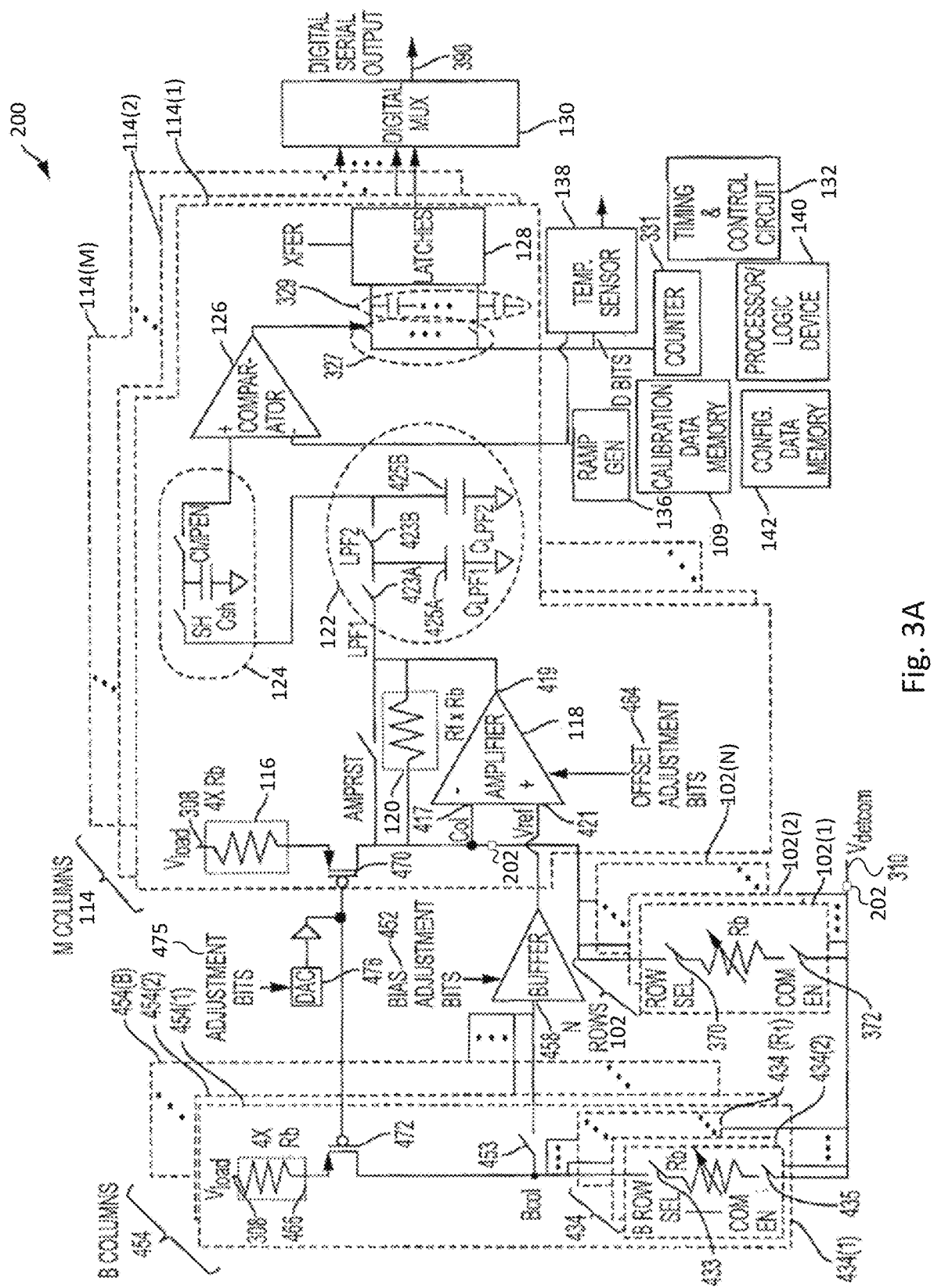
FIG. 3A illustrates a bolometer circuit of an imaging system and several locations where an offset circuit may be implemented in accordance with one or more embodiments of the present disclosure.
Figure 3B:
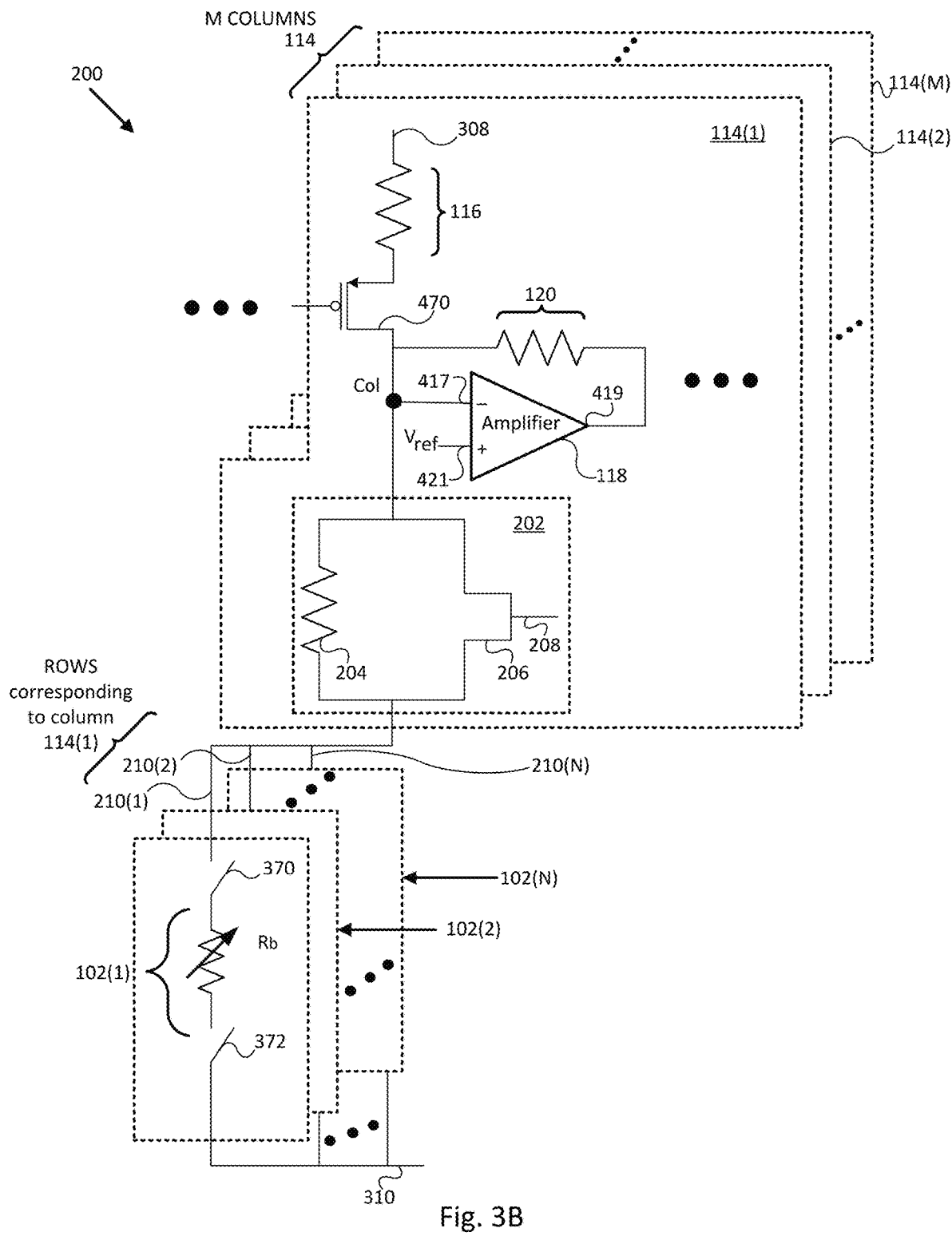
FIGS. 3B-3C illustrate examples of offset circuits implemented at a column level in accordance with one or more embodiments of the present disclosure.
Figure 3C:
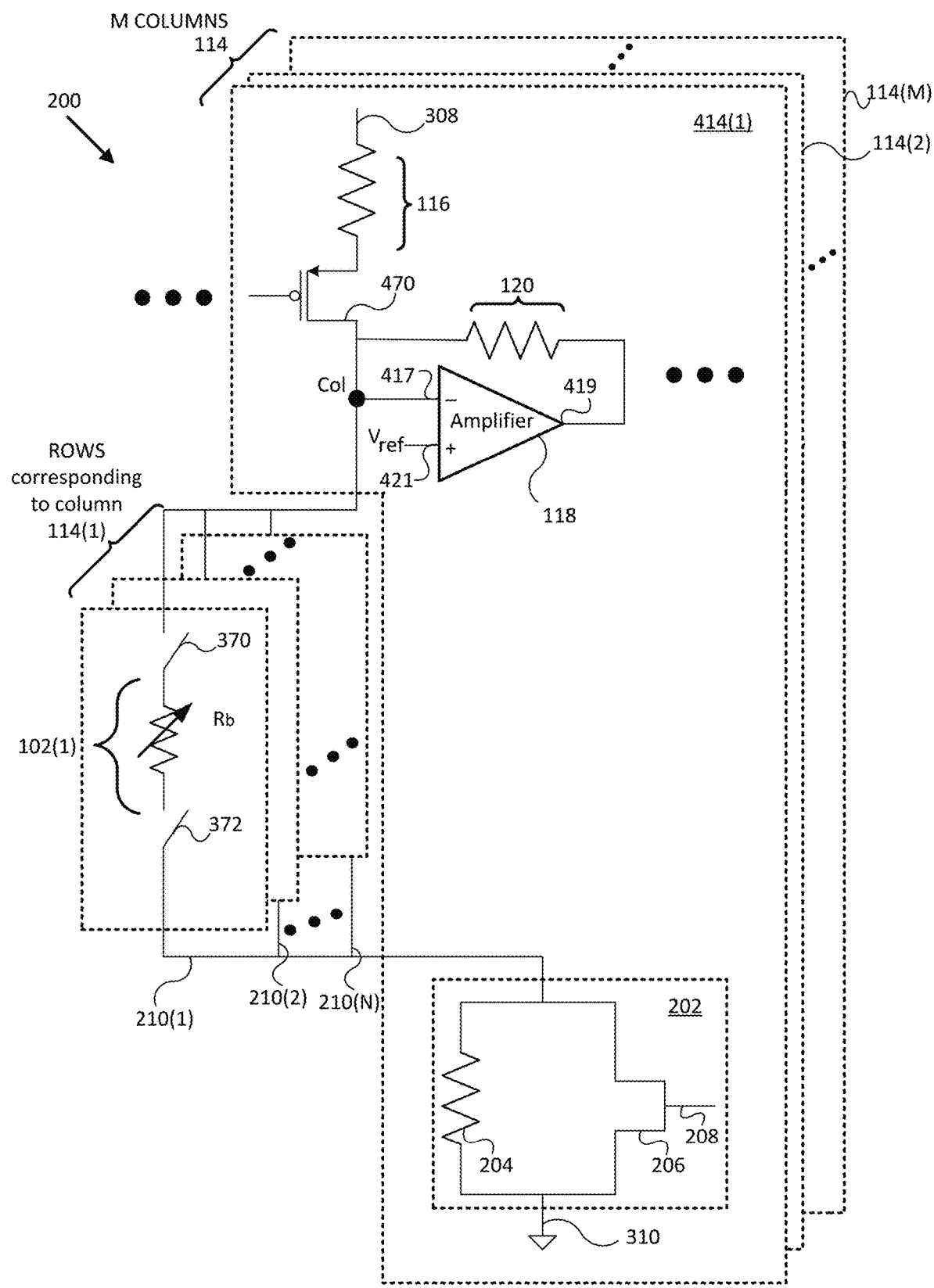

FIG. 3A illustrates example embodiments of bolometer circuit 200 having several locations where offset circuit 202 may be implemented at a column circuit level. FIGS. 3B-3C illustrate examples of offset circuits 202 implemented at a column level.

For example, FIG. 3B shows an offset circuit 202 implemented at the column level in that offset circuit 202 is implemented in each of the M number of column circuits 114. To illustrate, offset circuit 202 corresponding to column circuit block 114(1) may have a Col node at one end and column read lines 210 for the column circuit block 114(1) switchably coupled at a second end such that offset circuit 202 may be placed in series with a current one of active bolometer 102(1)-102(N) corresponding to column circuit block 114(1) according to a timing scheme for reading out the active bolometers 102(1)-102(N) during capture of image frames.

Offset circuit 202 may be located in several other locations according to various embodiments. For example, offset circuit 202 may be located between thermally shorted bolometer 116 and transistor 470 or between thermally shorted bolometer 116 and supply voltage node 308 in some embodiments. In some embodiments, when offset circuit 202 is added on either side of thermally shorted bolometer 116, then offset resistor 204 may be scaled up appropriately to provide the same offset at the output compared to offset circuit 202 being placed near active bolometer 102. If thermally shorted bolometer 116 is four times (e.g., 4×) the size of active bolometer 102, then offset resistor 204 placed near thermally shorted bolometer 116 may be implemented as four times the size of an offset resistor placed near active bolometer 102. For example, if an offset resistor placed near active bolometer 102 is determined to be 500 ohms, and thermally shorted bolometer 116 is four times the size of active bolometer 102, then an offset resistor 204 near thermally shorted bolometer 116 may be sized at approximately 2000 ohms in some embodiments.

Offset circuits 202 may be implemented in the additional columns 114(2)-114(M) in a similar fashion such that the offset circuits 202 may be placed in series with a current one of active bolometers corresponding to the column circuit block according to the timing scheme for reading out the active bolometers of the focal plane array during capture of the image frame.

In the implementation shown in FIG. 3B, offset circuit 202 may include resistor 204 and switch 206 in parallel with resistor 204 and configured to selectively direct a current though resistor 204 and each of the active bolometer 102(1)-102(N) as they are selected for column readout corresponding to column circuit block 114(1) to selectively superimpose a fixed-pattern noise to the output signal of each active bolometer 102(1)-102(N) of the column during a test mode operation for the focal plane array. In some examples, offset circuit 202 may be activated to superimpose the offset on all of the active bolometers 102(1)-102(N) corresponding to column circuit block 114(1), while in other examples an activation pattern may be used to test every other active bolometer 102 of the column. In some examples, individual active bolometers 102 of the column may be selected for testing, and in such cases, offset circuit 202 may only be activated for the individually selected active bolometers 102 of the column during a column read out for an image frame capture.

An offset circuit 202 may be implemented in each of column circuit blocks 114(2)-114(M). Like the offset circuit 202 implemented in 114(1), such offset circuits 202 may include a resistor and switch in parallel with the resistor and configured to selectively direct a current through the resistor and each of the active bolometers corresponding to the column as they are selected for column readout to selectively superimpose a fixed-pattern noise to the output signal of each active bolometer of the column during the test mode operation for the focal plane array.

Gate 208 of switch 206 may be selectively activated such that switch 206 may close, allowing the current to bypass resistor 204 in a normal mode of operation, or open, causing the current to pass through resistor 204 in a test mode of operation according to some embodiments. For example, timing and control circuit 132 may be configured to generate control signals for selectively activating switch 206 via gate 208 according to specified timing to enable testing of active bolometers of the focal plane array. For example, in an embodiment, timing and control circuit 132 may open switch 208 for each of the offset circuits 202 in the column circuit blocks 114 during a test mode of operation to test each of the active bolometers 102 in the focal plane array. In this regard, each of the active bolometers 102 corresponding to a column may be read out with an offset superimposed onto its output signal. However, as discussed above, individual active bolometers 102 in a column may be selected for testing, and in such cases, the offset circuit 202 of the column circuit block may be activated only for the readout of the individually selected active bolometers 102.

An equivalent resistance based on the resistance of active bolometer 102(1) and resistor 204 will be relatively greater than the resistance of active bolometer 102(1) alone (e.g., when switch 206 is closed and resistor 204 is bypassed) according to some embodiments. As such, a voltage differential across resistor 204 and active bolometer 102(1) will be greater relative to a voltage differential across active bolometer 102(1) alone when switch 206 is closed. Thus, when switch 206 is open, the output signal of active bolometer 102(1) received at the Col node of column circuit 114(1), in response to active bolometer 102(1) receiving external thermal radiation, may be greater as resistor 204 causes an offset voltage to be superimposed to the output signal of active bolometer 102(1) to provide a modified output signal.

The modified output signal may propagate through column circuit block 114(1) and/or additional readout integrated circuitry as discussed with reference to FIGS. 1 and 2A.

In some embodiments, processor/other logic device 140 may be used to further process the modified output signals once they have been readout by the readout integrated circuit. For example, logic device 140 may perform processing for each of the modified output signals by operating to compare the modified output signal to an expected output or output range associated with the externally received thermal radiation and the fixed-pattern noise.

In some embodiments, the expected output and/or output range may be calculated based on an offset value associated with the fixed-pattern noise. The fixed-pattern noise may be calculated as a function of a temperature associated with the focal plane array. For example, temperature sensor 138 of FIG. 1 may be configured to detect an ambient temperature associated with a substrate of the focal plane array. Consequently, the ambient temperature of the substrate of the focal plane array may be used to calculate the fixed-pattern noise and thus the offset value associated with the fixed-pattern noise.

Based on the comparison of the modified output signal to the expected output range, logic device 140 may further identify whether active bolometers are defective. For example, logic device 140 may determine that a modified output signal corresponding to active bolometer 102(1) is outside the expected output range, which may indicate the active bolometer 102(1) is defective. If the modified output signal is determined to be within the expected output range, active bolometer 102(1) may be identified as operating as intended (e.g., as normal).

As discussed with reference to FIG. 2A, the readout integrated circuit may convert the modified output signal to a digital output value. In this regard, the expected output range may comprise an expected output range of digital values to which the digital output value may be compared.

As an illustrative example, resistor 204 of offset circuit 202 may have a resistance of approximately 500 ohms. When activated during a test mode of operation, offset circuit 202 may modify the output signal of active bolometer 102(1) by offsetting a digital output value (e.g., counts determined from counter 331) of the active bolometer 102(1) by a delta amount (e.g., between 25 to 350 counts) between image frames. An expected output value for a pixel based on an intensity for external thermal radiation received by the focal plane array in a previous frame may be "X" for example. Thus, the expected output value may be "X" with a delta of an offset between 25 and 350 counts. If the modified output signal of active bolometer 102(1) is outside of an expected output value range (e.g., expected output value with margin of error), active bolometer 102(1) may be identified (e.g., flagged) as defective. It is noted that the offset of between 25 to 350 counts may be a difference between a frame without the offset and a frame with the offset added in a sequence of captured image frames. The offset range may be how the offset can change based on the ambient temperature of the focal plane array. For example, at a lower temperature, the offset between frames may be 25 counts and at a higher temperature, the offset between frames may be 350 counts.

It will be appreciated that resistor 204 may be implemented with various ohmic resistors to suit a desired application. In some embodiments, resistor 204 may have an ohmic resistance substantially equivalent to thermally shorted bolometer 116, which may be four times that of active bolometer 102(1). Similarly, switch 206 may be implemented with various circuit devices that provide the functionality of a switch. In some cases, resistor 204 may have a resistance of 500 ohms and switch 206 may be a MOSFET transistor (e.g., NMOS, PMOS). As previously discussed, in some embodiments, when offset circuit 202 is added on either side of thermally shorted bolometer 116, then offset resistor 204 may be scaled up appropriately to provide the same offset at the output compared to offset circuit 202 being placed near active bolometer 102. If thermally shorted bolometer 116 is four times (e.g., 4×) the size of active bolometer 102, then offset resistor 204 placed near thermally shorted bolometer 116 may be implemented as four times the size of an offset resistor placed near active bolometer 102. For example, if an offset resistor placed near active bolometer 102 is determined to be 500 ohms, and thermally shorted bolometer 116 is four times the size of active bolometer 102, then an offset resistor 204 near thermally shorted bolometer 116 may be sized at approximately 2000 ohms in some embodiments.

In further implementations, offset circuit 202 may be implemented as a single variable transistor such as a MOSFET. The voltage level of the MOSFET may be controlled to adjust the resistance of the MOSFET to provide an offset in a similar fashion to the resistor 204 and switch 206 implementation discussed above.

FIG. 3C illustrates a location where an offset circuit 202 may be implemented at a column level of bolometer circuit 200 such that the offset circuit 202 is implemented in each of the M number of column circuits 114. As shown in FIG. 3C, offset circuit 202 corresponding to column circuit block 114(1) may have common voltage node 310 at one end and column read lines 210 for the column circuit block 114(1) switchably coupled at a second end such that offset circuit 202 may be placed in series with a current one of active bolometer 102(1)-102(N) corresponding to column circuit block 114(1) according to a timing scheme for reading out the active bolometers 102(1)-102(N) during capture of an image frame (e.g., a thermal image frame intended for a test mode of a focal plane array). Similarly, offset circuits 202 may be implemented in the additional columns 114(2)-114(M) such that the offset circuits 202 may be placed in series with a current one of active bolometers corresponding to the column circuit block according to the timing scheme for reading out the active bolometers of the focal plane array during capture of the image frame.

The description of offset circuit 202 with reference to FIG. 3B may generally be applied to the offset circuit 202 shown in FIG. 3C. When offset circuit 202 is activated, output signals read out for active bolometers 102(1)-102(N) may have an offset superimposed thereon to provide a modified output signal at the Col node and consequently output 419 of amplifier 118. The modified output signal may be read out as an analog or digital value and compared to an expected value or range of values to determine whether the particular active bolometer corresponding to the modified signal is defective.

Figure 4A:
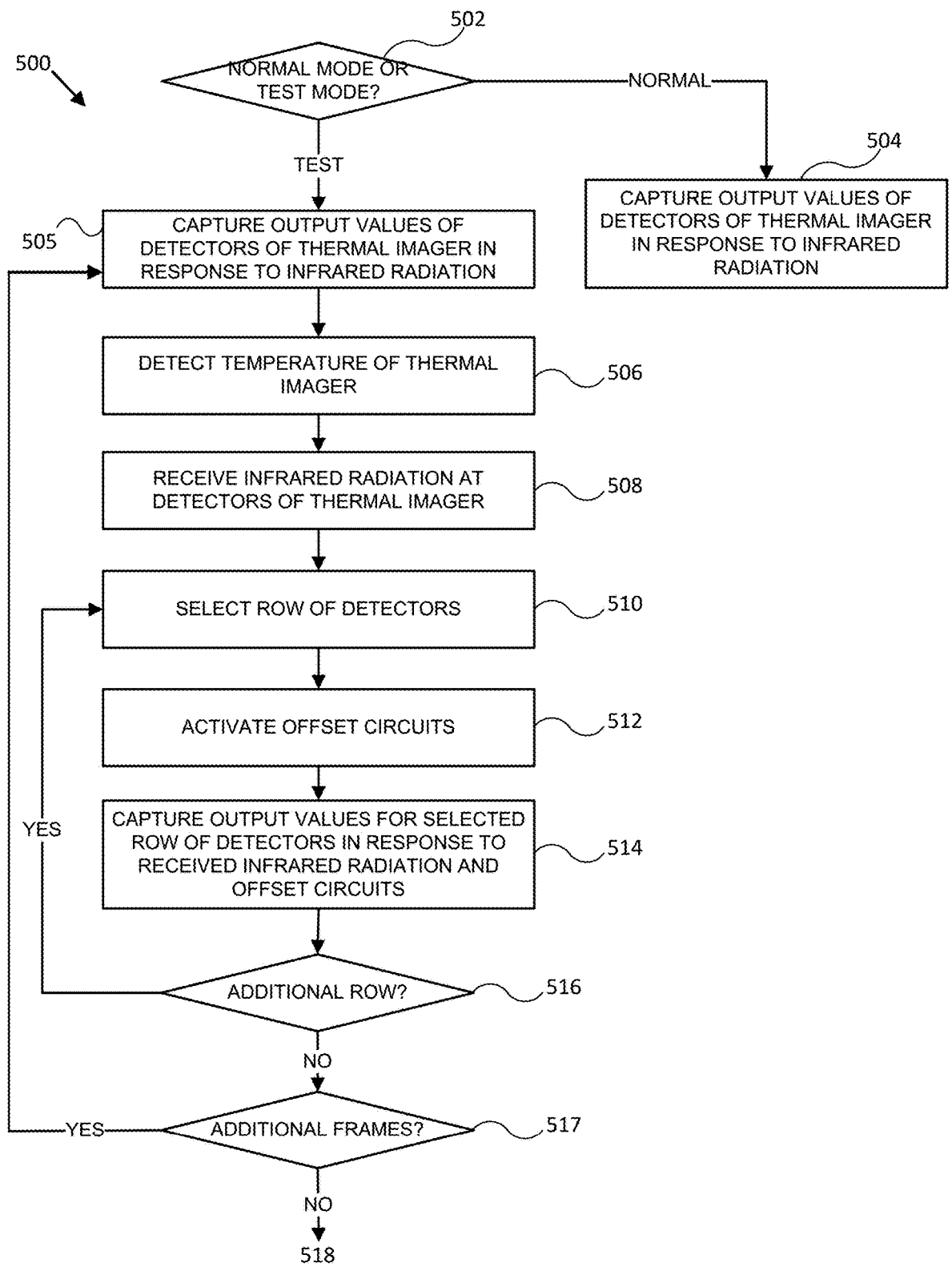
FIGS. 4A-4B illustrate a flow diagram of an example process for testing infrared detectors of a thermal imager in accordance with one or more embodiments of the present disclosure.
Figure 4B:
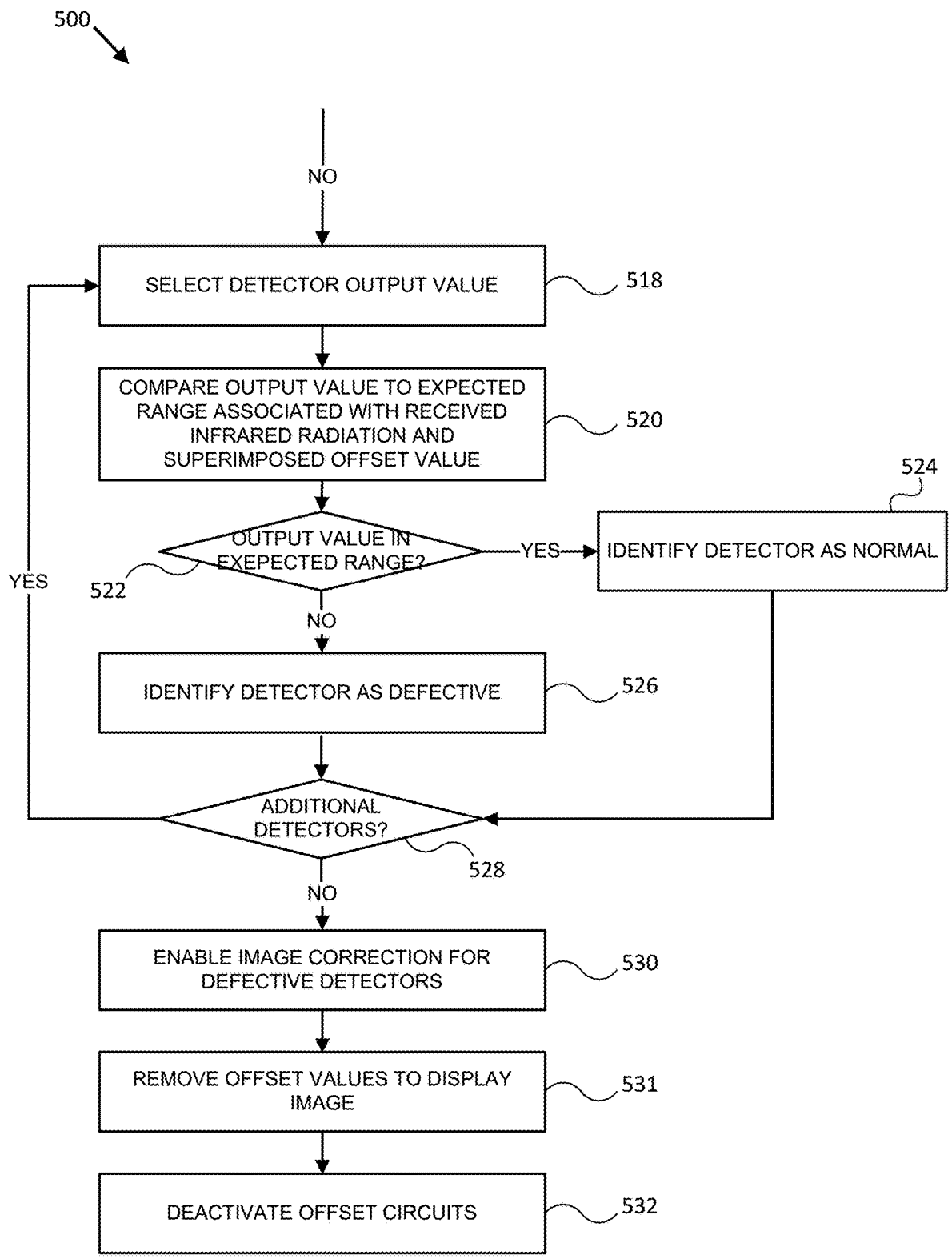

FIGS. 4A-4B illustrate a flow diagram of a process 500 for testing an integrity of a focal plane array of a thermal imager using an intentional offset in accordance with embodiments of the disclosure. It should be appreciated that any step, sub-step, sub-process, or block of process 500 may be performed in an order or arrangement different from the embodiments illustrated by FIGS. 4A and 4B. For example, in other embodiments, one or more blocks may be omitted from or added to the process. For illustrative purposes, process 500 is described in reference to FIGS. 1-3C and 5A-6B but the following description of process 500 is not limited to such figures.

At block 502, a logic device 140 of the thermal imager may determine whether the thermal imager is in a normal mode or test mode. If the thermal imager is in a normal mode of operation, process 500 may proceed to block 504 in which the thermal imager operates in a normal mode of operation. For example, the thermal imager may capture output values of detectors (e.g., active bolometers 102) as described with respect to FIG. 1.

If logic device 140 determines that the thermal imager is in a test mode, process 500 proceeds to block 505. At block 505, output values of the thermal imager may be captured in response to infrared radiation as described with respect to FIG. 1. The infrared radiation may be from a scene. In some cases, the infrared radiation of the scene may have non-uniform intensity. In other cases, the infrared radiation may have uniform intensity. The output values captured at block 505 may be used as a first image frame that provides an expected base set of output values to which output values with offsets superimposed thereon may be compared as further described below.

At block 506, logic device 140 detects the temperature of the focal plane array of the thermal imager. For example, logic device 140 may be communicatively coupled to temperature sensor 138 such that logic device 140 may communicate with temperature sensor 138 to determine an ambient temperature (e.g., substrate temperature) of the focal plane array. In some embodiments, a fixed offset may be calculated as a function of the temperature.

At block 508, the detectors of the thermal imager proceed to receive thermal radiation for detector integrity testing purposes. For example, the detectors may receive infrared radiation from an image frame that is substantially the same as a previous image frame captured at block 505 so that an output value readout from the thermal imager can be expected based on the previously captured image frame.

To further illustrate, the detectors may receive infrared radiation from an image frame in a sequence of image frames where a first image frame with no offset (e.g., block 505) is followed by a second image frame (e.g., block 508) where the offset is applied (e.g., block 512). In this regard, taking the difference of the frames and checking for the correct offset allows for an integrity check of selected detectors. Additionally, switching the offset between successive frames may limit scene changes or other slow-moving noise sources from impacting the magnitude of each detector significantly. To check all detectors, some setup measures may be taken such that the scene does not cause any detectors to output a maximum or minimum value and the scene is not substantially changing between frames with no offset and frames with an offset added.

In some instances, a static scene may not be needed for integrity testing purposes if there is further processing that can estimate which detector outputs of the scene changed due to the scene. Contemplated techniques include looking at how the scene has changed in the past and/or waiting to see how the scene changes in subsequent frames. Detector outputs that likely changed due to the scene would not be evaluated as non-defective or defective at this time but would be queued to be evaluated at a later time when they were likely looking at an unchanging scene in both of the frame pairs. One advantage of not needing a known static scene may be that the focal plane array may continue to perform its intended function (gathering scene information) while also checking that its output is valid.

At block 510, rows of the focal plane array of detectors are selected to be read out in a row-by-row fashion. For example, a first row may be read out, a second row may be read out, etc. until a last row is read out as illustrated by the looping block 516 and described herein in reference to FIG. 1.

At block 512, offset circuits 202 are selectively activated for each of the rows of detectors being read out during capture of the test image frame. For example, in an implementation where an offset circuit 202 is disposed within each unit cell corresponding to a detector of the focal plane array, the offset circuit 202 may be selectively activated to superimpose a fixed-offset (fixed-pattern noise) to the output signal of the detector. For example, such an implementation of an offset circuit 202 is shown and described above in reference to FIGS. 2A-2C. For example, in another implementation where an offset circuit 202 is disposed within each column circuit block corresponding to a column of detectors of the focal plane array, the offset circuit 202 may be selectively activated to superimpose a fixed-offset (fixed-pattern noise) to the output signal of the detectors of the column. For example, such an implementation of an offset circuit 202 is shown and described above in reference to FIGS. 3A-3C.

Figure 5A:
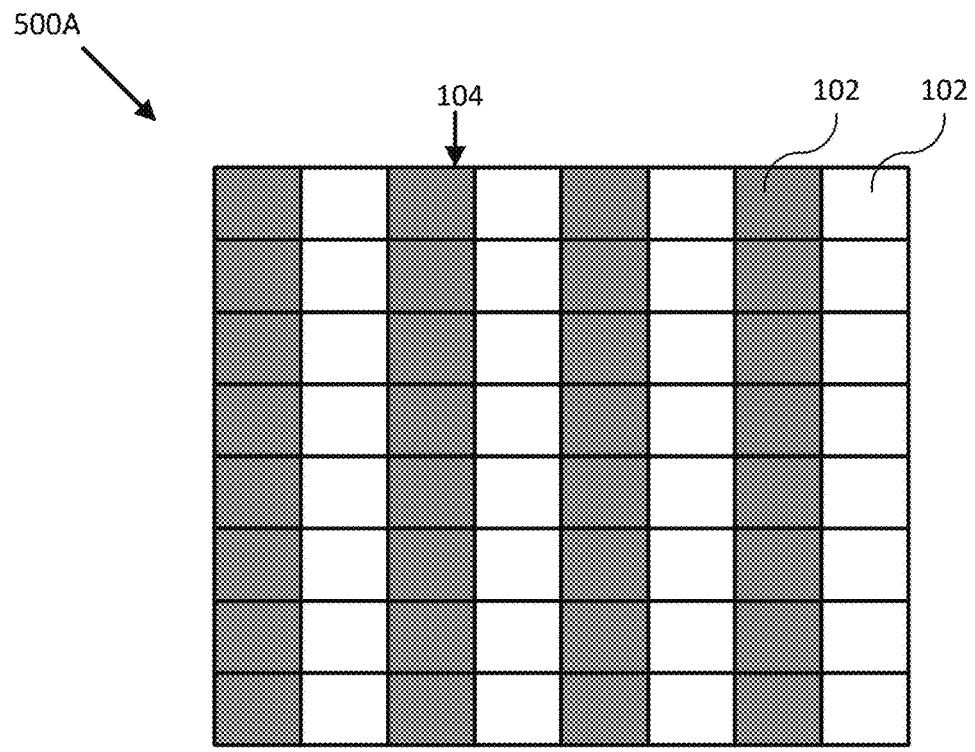
FIGS. 5A-6B illustrate example patterns of fixed-offsets that may be induced in a readout of a focal plane array of an imaging system to test the integrity of the focal plane array in accordance with one or more embodiments of the present disclosure.
Figure 5B:
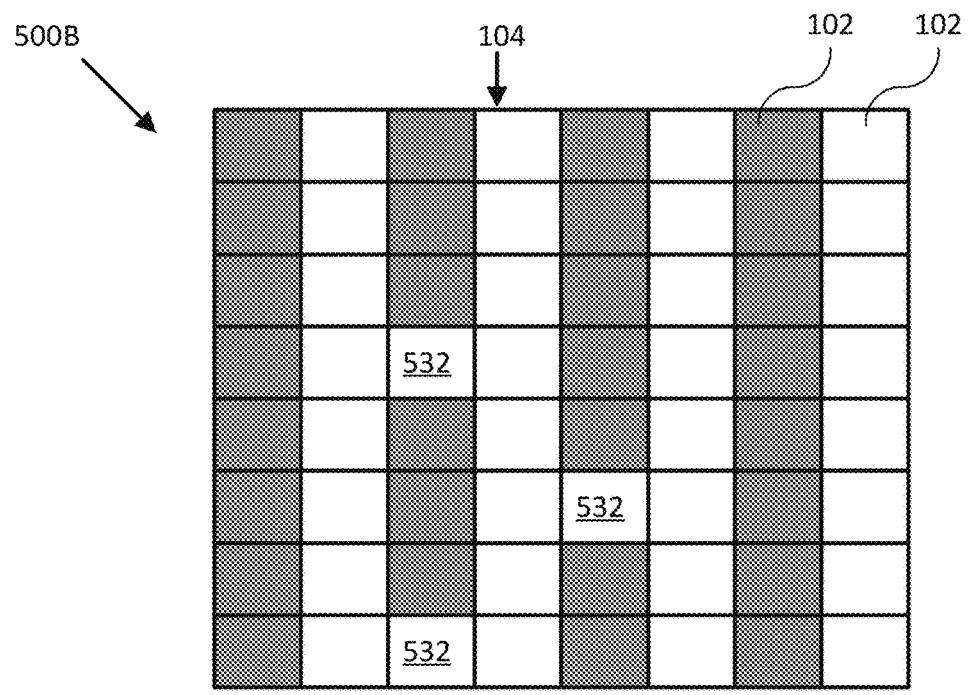
Figure 6A:
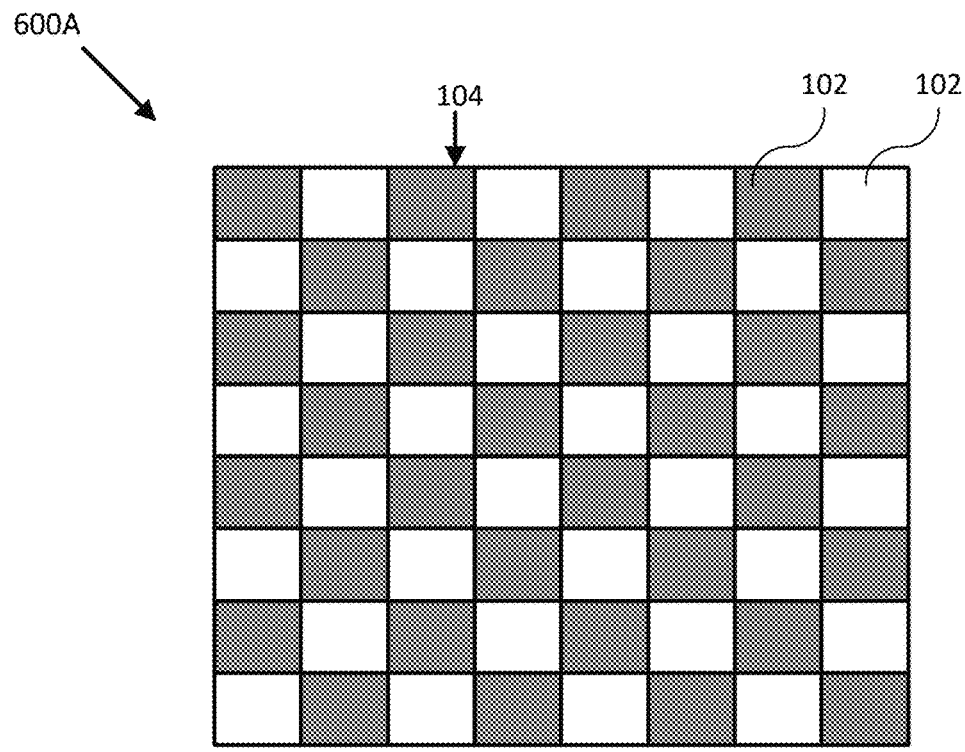
Figure 6B:
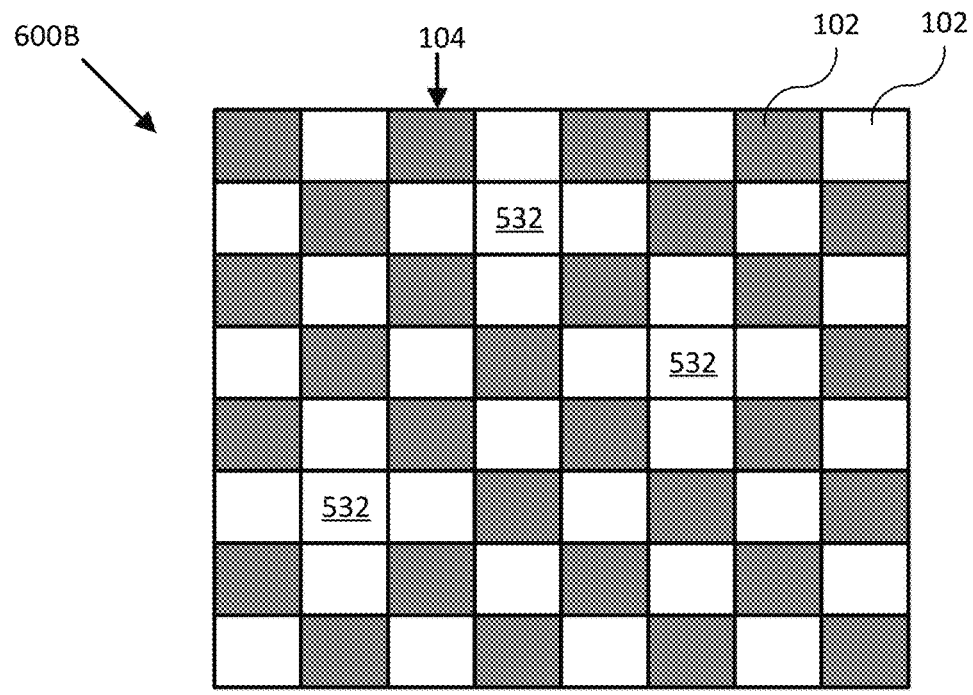

In some embodiments, offset circuit 202 may be selectively activated such that certain detectors (e.g., active bolometers 102) are selected for integrity testing. For example, as shown in FIG. 5A, a test pattern 500A may be used wherein every other offset circuit 202 of a column circuit is selectively activated to test the detectors of that column. As another example, as shown in FIG. 6A, a test pattern 600A may be used wherein alternating offset circuits 202 in the unit cells 104 corresponding to detectors may be activated. Darker shaded boxes in FIGS. 5A-6B may represent detectors that are selected for testing and for which connected offset circuits 202 are activated. Various patterns may be injected and checked for at a readout integrated circuit output. In one case, a high-low alternating pattern may be used as a test pattern where offset circuits 202 may be activated to superimpose a high-low alternating pattern to an output signal for a focal plane array. If the pattern is not observed across the readout line, detectors that do not conform may be marked as defective. For example, as shown in FIGS. 5B and 6B and further described below, detectors 532 may be identified as defective via process 500. It is noted that when an edge is detected in a test image, the high-low alternating pattern may be avoided.

As each row of detectors is read out, operations at block 514 are performed, in which output values for detectors are captured for the selected row of detectors. The output values may represent a detector's response to the received infrared radiation and include an offset from activated offset circuits 202. In other words, the captured values may correspond to pixel intensities of the test image frame with an offset superimposed on the pixel intensity by activation of the offset circuits 202.

Once the values have been captured from the selected rows, process 500 may proceed to block 517. At block 517, additional frames may be captured if a setting configuration in the test mode of operation calls for such. For example, additional base frames and/or sequential frames wherein the offset circuit 202 is activated may be captured such that an average for output values of the base frames and/or an average for output values of the sequential frames may be used for comparison purposes when checking the integrity of detectors. Each frame may be saved in memory for further processing.

When there are no additional frames to capture, process 500 proceeds to checking the integrity of the detectors at block 518. At block 518 a particular detector output value is selected by logic device 140 from the serial output provided by blocks 510-516. For example, the serial output may be digital serial output 390. In some embodiments, logic device 140 may select the particular detector output value from a particular frame if more than one frame with the offset circuits 202 activated was captured at block 517.

At block 520, the selected output value corresponding to a detector may be compared to an expected output or output range associated with the received thermal radiation of the captured image at block 505 and the superimposed offset value. As a simplified illustrative example, a test frame may radiate thermal radiation substantially equivalent to a previously captured image frame from block 505. In the previously captured image frame, the detector outputs may correspond to intensities of infrared radiation received at each detector. In the subsequent image frame, the offset circuits 202 may superimpose a delta value (positive or negative) offset to the detector outputs from the previously captured image frame when the scene is generally unchanged. Thus, an expected output for a detector during the test may be an expected output value based on the previously captured image frame with a delta value attributable to the offset (e.g., activation of offset circuits 202).

Although reference is made to capturing a first image with the offset circuit 202 disabled to determine base output values from which expected output values with the offset circuit 202 activated may be calculated, it is contemplated that additional image frames may be used to improve a propriety of the detector integrity check. For example, in some embodiments, the output values modified with the offset may be averaged over a number of image frame captures. The average may be compared to the expected output value. Similarly, in some embodiments, the expected output value may be calculated based on an average output value of image frame captures where the offset circuit 202 is disabled.

At block 522, logic device 140 may determine whether the output value matches the expected output value or is within an expected range (e.g., margin of error) of the expected output value. For example, based on the comparison performed at block 520, the logic device may be able to determine whether the output value is within the expected range. If the output value is within the expected range, logic device 140 may identify the detector as operating normally (e.g., not defective) at block 524. If the output value is outside the expected range, logic device 140 may identify the detector as defective (e.g., non-functional) at block 526. An expected output range may be a range centered around the expected output in some embodiments. In some cases, there may be more confidence in a result of a detector integrity test when a smaller range is used as opposed to a larger range.

At block 528, logic device 140 may determine whether there are additional detector output values to check. If there are additional detector output values to check, logic device 140 may repeat blocks 518, 520, 522, 524, and/or 526 until each detector output value has been checked and each of the corresponding detectors has been identified as normal or defective.

At block 530, logic device 140 may enable image correction for defective detectors. For example, a nearest neighbor technique may be implemented wherein the future output values of read out for a defective detector may be replaced by an estimated output value based on detector output values of detectors neighboring the defective detector. For example, an average of the neighboring detectors' output values may be used as an estimate output value for the defective detector during a normal mode of operation. As another example, the detector nearest to the defective detector and that has a detector output value determined to be most accurate in a test mode may serve as a mirror in which its output value may be copied and used as a replacement for the output value of the defective detector in future image frame captures during a normal mode of operation of the thermal imager. For example, a detector's accuracy may be determined based on how close its modified output signal during the test mode is to an expected output value.

In embodiments where a thermal imager comprising the focal plane array is used in an ADAS, the identified defective detectors may be reported upstream as feedback to the host ADAS which may then take remedial action if the defective detectors are in a mission critical area of the focal plane array. For example, the host ADAS may quickly enter a safe state if the defective detectors are in the mission critical area of the focal plane array. In a safe state, the ADAS may refrain from relying on the defective detectors to make safety decisions.

At block 531, offsets that were applied to detectors may be removed for image display. Thus, image pixels associated with the detectors that have had offsets applied may show the image of the scene substantially unchanged by the offset applied to the detectors. Thus, a user may be able to run the test mode of the focal plane array while still directing the focal plane array to a scene of interest to capture an image of the scene.

At block 532, offset circuits 202 are deactivated in preparation for another iteration of process 500. Accordingly, it will be appreciated that process 500 may be repeated to operate the thermal imager in a normal mode or test mode.

As used herein, "value" and "signal" may be used interchangeably and represent either an analog signal or digital value according to the various embodiments presented. For example, "value" or "signal" may mean a voltage, current, or digital count determined using counter 331, ramp generator 136, comparator 126, latch 128, and other various components described in reference to bolometer circuits 100 and 200 to capture values or signals associate with active bolometers (e.g., thermal or infrared detectors). The digital count may be part of digital serial output 390.

Additional embodiments are contemplated. For example, although various offset circuits 202 have been disclosed that introduce additional resistance that causes a modified output signal to be provided, other techniques may be used in addition to and/or instead of offset circuits 202.

For example, in some embodiments, logic device 140, calibration data memory 109, and various circuit paths may be used in combination with one or more circuit components of bolometer circuit 200 to provide a plurality of offset circuits (e.g., also referred to as additional offset circuits). Such implementations may be used to provide any of the example patterns of fixed-offsets discussed herein such as those illustrated in FIGS. 5A-6B and/or others as appropriate.

For example, logic device 140 may selectively adjust any of adjustment bits 452, 464, and/or 475 to adjust the operation of circuit components in electrical communication with the focal plane array such as buffer 458, amplifier 118, and/or DAC 476 to provide a modified output signal at node 419 that is filtered by LPF 122 and captured by sample-and-hold circuit 124.

For example, in one embodiment of the offset circuits, logic device 140 may selectively update adjustment bits 452 stored in calibration data memory 109 to adjust the offset of buffer 458 to change the reference voltage level provided to input 421 of amplifier 118. As a result, the voltage provided to node 419 will be adjusted.

In another embodiment of the offset circuits, logic device 140 may selectively update adjustment bits 464 stored in calibration data memory 109 to adjust the offset of amplifier 118 to change the voltage level at node 417. As a result, the voltage provided to node 419 will be adjusted.

In another embodiment of the offset circuits, logic device 140 may selectively update adjustment bits 475 stored in calibration data memory 109 to adjust the digital data values provided to digital-to-analog converter (DAC) 476 to change the variable voltage provided to the gates of MOSFETs 470 and 472. This causes adjustments to the load currents provided to active bolometers 102 affecting their bias and gain, resulting in an adjusted voltage at node 419.

Advantageously, by selectively updating adjustment bits 452, 464, and/or 475 as discussed, the operation of active bolometers 102, blind bolometers 434, and/or calibration data memory 109 may all be tested simultaneously.

In some embodiments, bolometer circuit 200 may include one or more reference rows or columns of active bolometers 102 which are used for testing and/or reference purposes but do not contribute to captured image data. In some embodiments, adjustment bits only affecting one or more reference rows or columns may be modified, thus permitting testing without affecting signals (e.g., images) captured by other active bolometers 102.

Figure 7:
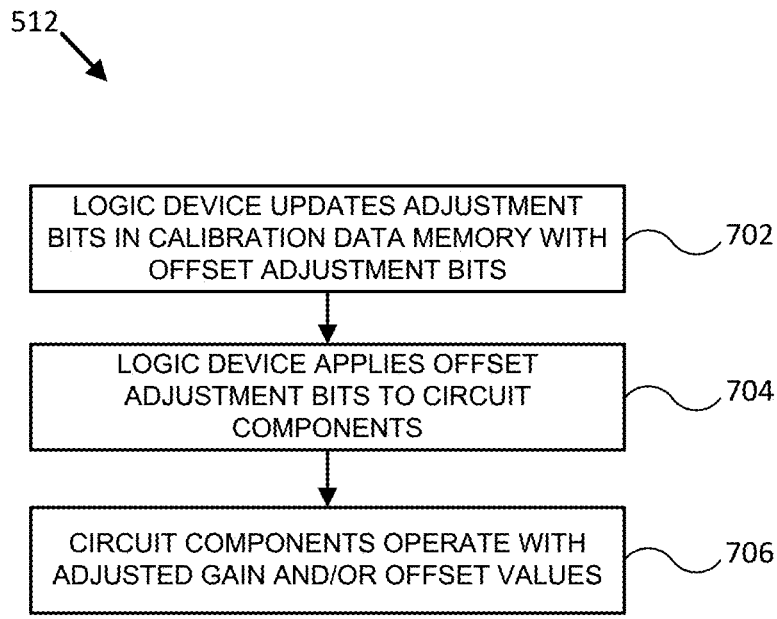
FIG. 7 illustrates a flow diagram of activating offset circuits in accordance with one or more embodiments of the present disclosure.

In some embodiments, process 500 of FIGS. 4A-4B may be operated using additional offset circuits (e.g., implemented by logic device 140, calibration data memory 109, and circuit paths) in combination with one or more circuit components of bolometer circuit 200. In various embodiments, such additional offset circuits may be used instead of and/or with offset circuits 202. For example, block 512 may include activating the additional offset circuits. In this regard, FIG. 7 illustrates a flow diagram performed during block 512 for additional offset circuits.

In block 702, logic device 140 updates one or more sets of adjustment bits 452, 464, and/or 475 in calibration data memory 109 with offset adjustment bits.

In block 704, logic device 140 applies the updated offset adjustment bits 452, 464, and/or 475 to buffer 458, amplifier 118, and/or DAC 476. For example, logic device 140 may direct appropriate read circuitry of calibration data memory 109 to pass the updated offset adjustment bits 452, 464, and/or 475 to buffer 458, amplifier 118, and/or DAC 476 through appropriate circuit paths (e.g., partially illustrated for purposes of clarity and denoted by arrows connected to buffer 458, amplifier 118, and DAC 476).

In block 706, buffer 458, amplifier 118, and/or DAC 476 operate in accordance with the updated offset adjustment bits 452, 464, and/or 475 to provide an adjusted (e.g., offset) voltage at node 419 to superimpose fixed-pattern noise in the output signals provided by bolometer circuit 200 as similarly discussed with regard to offset circuits 202.

Figure 8:
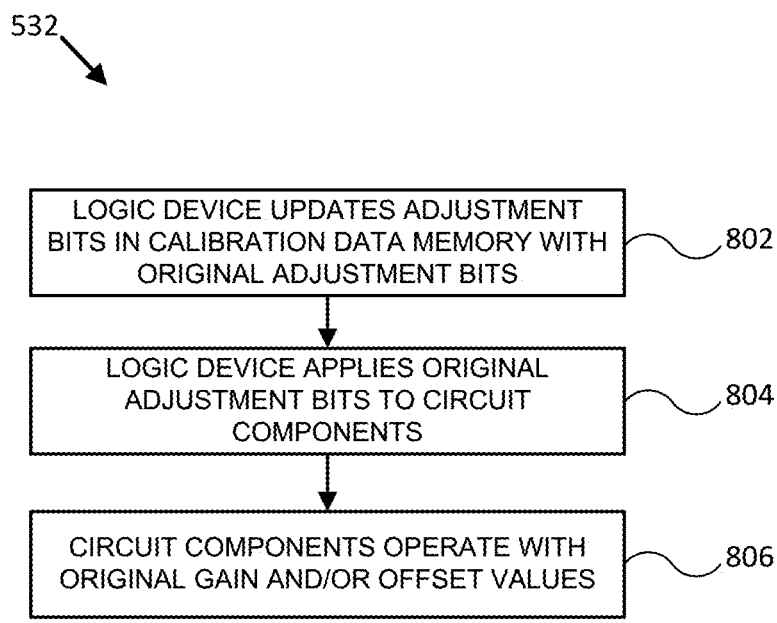
FIG. 8 illustrates a flow diagram of deactivating offset circuits in accordance with one or more embodiments of the present disclosure.

It will be appreciated that the remaining blocks of process 500 may be operated using the additional offset circuits in the same or similar manner as offset circuits 202. For example, block 532 may include deactivating the additional offset circuits. In this regard, FIG. 8 illustrates a flow diagram performed during block 532 for additional offset circuits.

In block 802, logic device 140 updates one or more sets of adjustment bits 452, 464, and/or 475 in calibration data memory 109 with their original (e.g., non-offset) values.

In block 804, logic device 140 applies the updated original adjustment bits 452, 464, and/or 475 to buffer 458, amplifier 118, and/or DAC 476.

In block 806, buffer 458, amplifier 118, and/or DAC 476 operate in accordance with the updated original adjustment bits 452, 464, and/or 475 to provide an original (e.g. non-offset) voltage at node 419.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A system comprising:
a focal plane array comprising a plurality of infrared detectors arranged in a plurality of rows and columns, wherein each of the infrared detectors is configured to provide an output signal in response to externally received thermal radiation;
a plurality of offset circuits electrically coupled to the focal plane array and configured to selectively superimpose fixed-pattern noise on the output signals to provide modified output signals;
a readout integrated circuit configured to provide the modified output signals for processing by a logic device; and
the logic device configured to perform the processing for each of the modified output signals by operating to:
compare the modified output signal to an expected output range associated with the thermal radiation and the fixed-pattern noise, and
identify the infrared detector corresponding to the modified output signal as defective if the modified output signal is outside the expected output range.

2. The system of claim 1, wherein the logic device is further configured to:
determine a value associated with the fixed-pattern noise based on a temperature associated with the focal plane array;
determine a known value associated with the thermal radiation based on a previous image frame captured while the offset circuits were disabled; and
calculate the expected output range based on the known value associated with the thermal radiation and the value associated with the fixed-pattern noise.

3. The system of claim 1, wherein each of the offset circuits comprises:
a resistor; and
a switch in parallel with the resistor and configured to selectively direct a current passed by at least one of the infrared detectors through the resistor to selectively superimpose the fixed-pattern noise on the output signal.

4. The system of claim 1, wherein each of the offset circuits comprises a transistor configured to selectively adjust a current passed by at least one of the infrared detectors through the transistor to selectively superimpose the fixed-pattern noise on the output signal.

5. The system of claim 1, wherein each of the offset circuits is in series with a corresponding one of the infrared detectors in a corresponding unit cell disposed in the focal plane array.

6. The system of claim 1, further comprising:
a plurality of column read lines configured to pass the output signals from the infrared detectors; and
wherein each of the offset circuits is in series with a corresponding one of the column read lines and is configured to modify the output signals of the infrared detectors associated with the corresponding column read line.

7. The system of claim 1, wherein:
the offset circuits comprise:
the logic device,
a memory comprising adjustment bits, and
circuit paths configured to provide the adjustment bits to a circuit component in electrical communication with the focal plane array; and
the logic device is configured to selectively update the adjustment bits to adjust an operation of the circuit component to selectively superimpose the fixed-pattern noise on the output signals.

8. The system of claim 7, wherein the circuit component comprises:
a buffer configured to provide a reference voltage level to an amplifier configured to receive a signal from at least one of the infrared detectors;
the amplifier; and/or
a digital-to-analog converter (DAC) configured to adjust a bias voltage of one or more of the infrared detectors.

9. A method of operating the system of claim 1, the method comprising:
activating the offset circuits to superimpose the fixed-pattern noise;
reading out the modified output signals;
operating the logic device to perform the processing; and
enabling a correction adjustment for the infrared detectors identified as defective, wherein the correction adjustment replaces future output signals read out from the defective infrared detectors.

10. A method comprising:
receiving external thermal radiation onto a focal plane array comprising a plurality of infrared detectors arranged in a plurality of rows and columns and configured to receive the external thermal radiation and provide an output signal in response to the externally received thermal radiation;
selectively superimposing fixed-pattern noise on the output signals to provide modified output signals, wherein the superimposing is performed using a plurality of offset circuits electrically coupled to the focal plane array and configured to selectively superimpose the fixed-pattern noise on the output signals to provide the modified output signals;
reading out the modified output signal from each of the infrared detectors of the focal plane array in a row-by-row fashion for processing by a logic device, wherein the reading is performed using a readout integrated circuit electrically coupled to the focal plane array;
comparing, using the logic device, the modified output signal to an expected output range associated with the thermal radiation and the fixed-pattern noise; and
identifying, using the logic device, the infrared detector corresponding to the modified output signal as defective if the modified output signal is outside the expected output range.

11. The method of claim 10, further comprising:
determining, using the logic device, a value associated with the fixed-pattern noise based on a temperature associated with the focal plane array;
determining a known value associated with the thermal radiation based on a previous image frame captured while the offset circuits were disabled; and
calculating, using the logic device, the expected output range based on the known value associated with the thermal radiation and the determined value associated with the fixed-pattern noise.

12. The method of claim 10, further comprising:
enabling a correction adjustment for the infrared detectors identified as defective, wherein the correction adjustment replaces future output signals read out from the defective infrared detectors.

13. The method of claim 10, wherein each of the offset circuits comprises:
a resistor; and
a switch in parallel with the resistor and configured to selectively direct a current passed by at least one of the infrared detectors through the resistor to selectively superimpose the fixed-pattern noise on the output signal.

14. The method of claim 10, wherein each of the offset circuits comprises a transistor configured to selectively adjust a current passed by at least one of the infrared detectors through the transistor to selectively superimpose the fixed-pattern noise on the output signal.

15. The method of claim 10, wherein each of the offset circuits is in series with a corresponding one of the infrared detectors in a corresponding unit cell disposed in the focal plane array.

16. The method of claim 10, wherein:
the focal plane array further comprises a plurality of column read lines configured to pass the output signals from the infrared detectors; and
each of the offset circuits is in series with a corresponding one of the column read lines and is configured to modify the output signals of the infrared detectors associated with the corresponding column read line.

17. The method of claim 10, wherein:
the offset circuits comprise:
the logic device,
a memory comprising adjustment bits, and
circuit paths configured to provide the adjustment bits to a circuit component in electrical communication with the focal plane array; and the method further comprising:
selectively updating the adjustment bits by the logic device,
providing the updated adjustment bits to the circuit component over the circuit paths, and
adjusting an operation of the circuit component in response to the updated adjustment bits to selectively superimpose the fixed-pattern noise on the output signals.

18. The method of claim 17, wherein the circuit component comprises:
a buffer configured to provide a reference voltage level to an amplifier configured to receive a signal from at least one of the infrared detectors;
the amplifier; and/or
a digital-to-analog converter (DAC) configured to adjust a bias voltage of one or more of the infrared detectors.

19. The system of claim 1, wherein:
the readout integrated circuit is further configured to convert the modified signal to a digital value; and
the expected output range comprises an expected output range of digital values.

20. The method of claim 10, further comprising:
converting, using the readout integrated circuit, the modified signal to a digital value, wherein the expected output range comprises an expected output range of digital values.

* * * * *